US010089505B1

(12) United States Patent
Huebner et al.

(10) Patent No.: US 10,089,505 B1
(45) Date of Patent: Oct. 2, 2018

(54) INVENTORY TRACKING USING RFID

(71) Applicant: Amazon Technologies, Inc., Seattle, WA (US)

(72) Inventors: Ronald Eugene Huebner, Seattle, WA (US); Somasundaram Niranjayan, Issaquah, WA (US); Camerin Hahn, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/869,882

(22) Filed: Sep. 29, 2015

(51) Int. Cl.
| | |
|---|---|
| *G06F 19/00* | (2011.01) |
| *G06Q 30/00* | (2012.01) |
| *G06Q 90/00* | (2006.01) |
| *G06K 7/10* | (2006.01) |
| *H01Q 1/22* | (2006.01) |
| *G06Q 10/08* | (2012.01) |

(52) U.S. Cl.
CPC ..... *G06K 7/10316* (2013.01); *G06K 7/10415* (2013.01); *H01Q 1/2216* (2013.01); *G06Q 10/087* (2013.01)

(58) Field of Classification Search
USPC .......... 235/375, 383, 385, 451, 492
See application file for complete search history.

(56) References Cited

U.S. PATENT DOCUMENTS

| | | | |
|---|---|---|---|
| 6,130,602 A | 10/2000 | O'Toole et al. | |
| 6,283,377 B1 * | 9/2001 | Takuma | G06K 19/07703 235/492 |
| 6,392,544 B1 * | 5/2002 | Collins | G06K 7/0008 340/10.1 |
| 7,225,980 B2 | 6/2007 | Ku et al. | |
| 7,339,481 B2 | 3/2008 | Duron | |

(Continued)

FOREIGN PATENT DOCUMENTS

WO  2016089409 A1  6/2016

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Tuyen K Vo
(74) *Attorney, Agent, or Firm* — Athorus, PLLC

(57) ABSTRACT

A storage unit includes a support bar for hanging items and an RFID antenna provided within a predefined distance of the support bar. When the items hanging from the support bar are adorned with RFID tags, and the RFID antenna emits electromagnetic fields in a direction of the support bar, RFID signals identifying the items are transmitted from the RFID tags to the RFID antenna, thereby enabling a placement or a removal of an item to be automatically registered, or an accounting of the available items to be automatically performed. The RFID antenna may be a portion of a transmission line that uses shields and/or dielectric materials to shape the electromagnetic fields toward a predefined direction, and the locations of items bearing RFID tags on the support bar may be determined by varying the phase of the emitted radiofrequency and determining strengths of RFID signals when the electromagnetic fields are emitted at varying phases.

20 Claims, 20 Drawing Sheets

(56) References Cited

U.S. PATENT DOCUMENTS

| | | |
|---|---|---|
| 7,456,746 B2 | 11/2008 | Loving et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 8,695,878 B2 * | 4/2014 | Burnside ............ G06Q 10/087 |
| | | 235/385 |
| 9,473,747 B2 | 10/2016 | Kobres et al. |
| 9,684,884 B2 | 6/2017 | Gentile et al. |
| 2003/0002712 A1 | 1/2003 | Steenburgh et al. |
| 2004/0181467 A1 | 9/2004 | Raiyani et al. |
| 2004/0195319 A1 * | 10/2004 | Forster ............ G06K 7/10346 |
| | | 235/385 |
| 2005/0052279 A1 | 3/2005 | Bridgelall |
| 2005/0171854 A1 * | 8/2005 | Lyon ................ G01G 19/4144 |
| | | 705/24 |
| 2007/0075911 A1 * | 4/2007 | Yaginuma ............ H01Q 13/20 |
| | | 343/853 |
| 2007/0139285 A1 | 6/2007 | Maruyama et al. |
| 2007/0200712 A1 | 8/2007 | Arneson et al. |
| 2008/0055087 A1 * | 3/2008 | Horii .................... G03B 21/00 |
| | | 340/572.1 |
| 2008/0077511 A1 | 3/2008 | Zimmerman |
| 2008/0109114 A1 | 5/2008 | Orita et al. |
| 2008/0258876 A1 * | 10/2008 | Overhultz .......... G06K 7/10336 |
| | | 340/10.2 |
| 2009/0121017 A1 | 5/2009 | Cato et al. |
| 2009/0152353 A1 * | 6/2009 | Tsirline ................ B41J 3/50 |
| | | 235/439 |
| 2009/0167500 A1 * | 7/2009 | Braun .................. G06K 7/0008 |
| | | 340/10.1 |
| 2009/0224040 A1 * | 9/2009 | Kushida ................ G06Q 10/08 |
| | | 235/385 |
| 2009/0245573 A1 | 10/2009 | Saptharishi et al. |
| 2011/0011936 A1 | 1/2011 | Morandi et al. |
| 2011/0153614 A1 * | 6/2011 | Solomon ................ B65G 1/127 |
| | | 707/740 |
| 2011/0266342 A1 * | 11/2011 | Forster ................ G06K 7/0008 |
| | | 235/385 |
| 2012/0034817 A1 | 2/2012 | Plate et al. |
| 2012/0284132 A1 | 11/2012 | Kim et al. |
| 2012/0287095 A1 * | 11/2012 | Cote ..................... G06Q 10/08 |
| | | 345/204 |
| 2013/0048724 A1 * | 2/2013 | Burnside ............ G06Q 10/087 |
| | | 235/385 |
| 2013/0076898 A1 | 3/2013 | Philippe et al. |
| 2013/0241704 A1 | 9/2013 | Nogami |
| 2013/0253700 A1 | 9/2013 | Carson et al. |
| 2014/0018390 A1 | 1/2014 | Tung |
| 2014/0184390 A1 | 7/2014 | Elizondo, II |
| 2014/0224875 A1 * | 8/2014 | Slesinger ............ H01R 25/142 |
| | | 235/385 |
| 2014/0263635 A1 * | 9/2014 | Jones ................... G06Q 10/087 |
| | | 235/385 |
| 2014/0279294 A1 | 9/2014 | Field-Darragh et al. |
| 2014/0316561 A1 | 10/2014 | Tkachenko et al. |
| 2015/0019391 A1 | 1/2015 | Kumar et al. |
| 2015/0039462 A1 | 2/2015 | Shastry et al. |
| 2015/0041616 A1 * | 2/2015 | Gentile ................ G06Q 10/087 |
| | | 248/550 |
| 2015/0073907 A1 | 3/2015 | Purves et al. |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

* cited by examiner

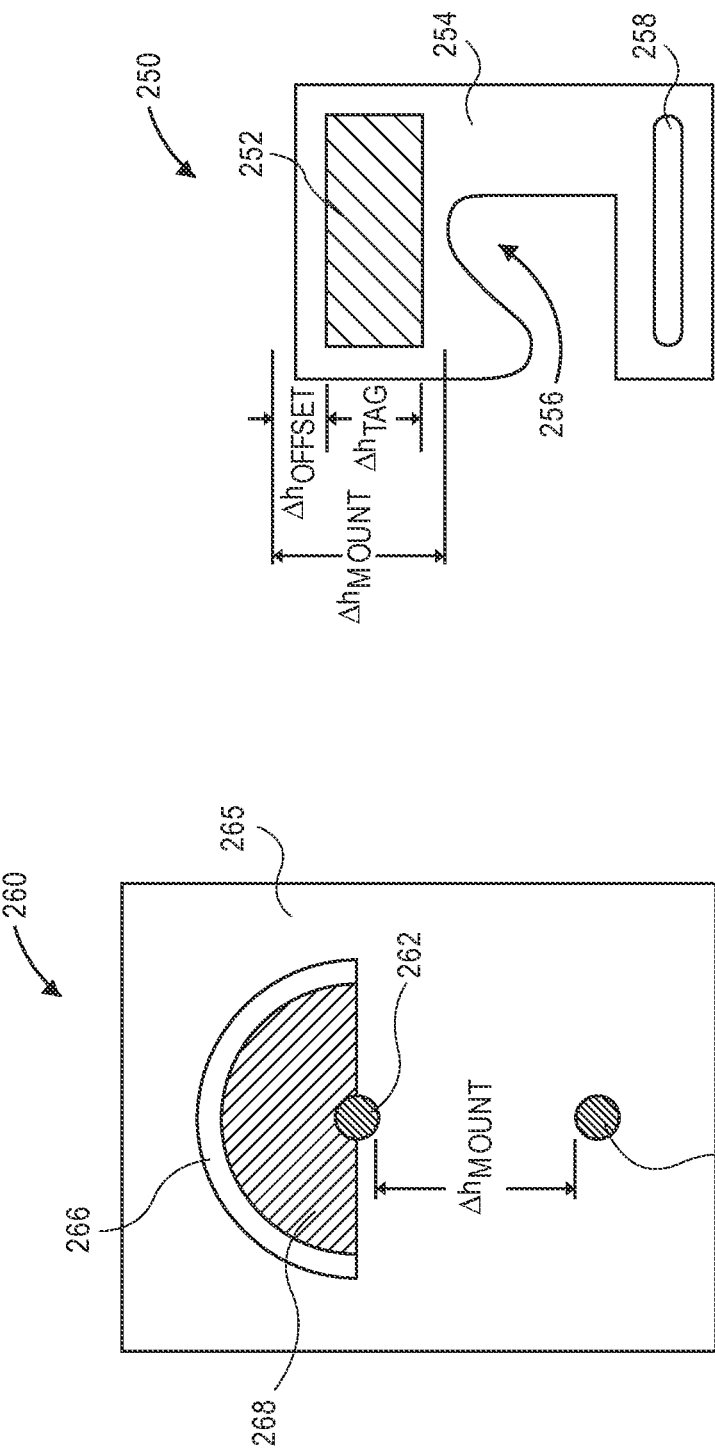

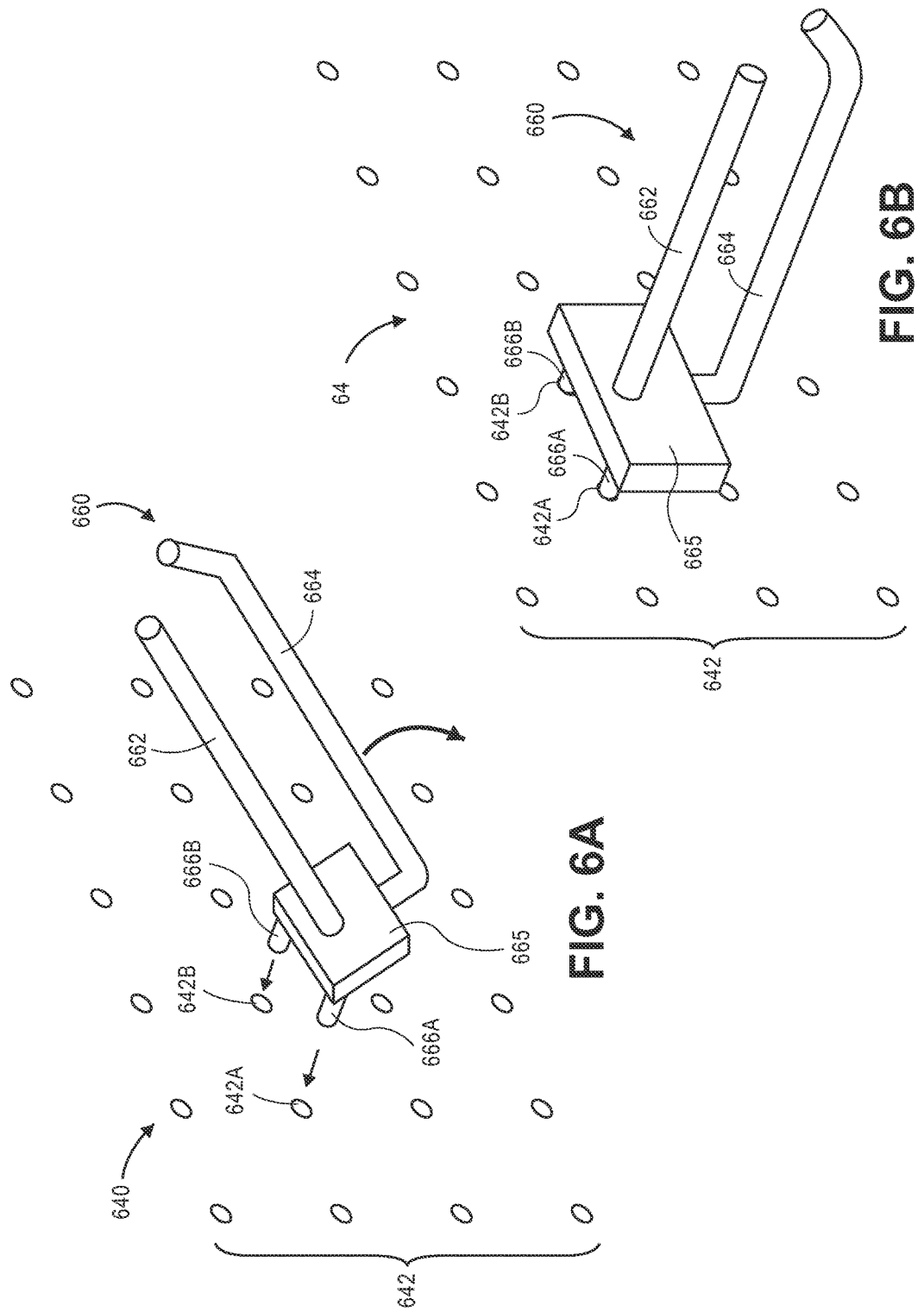

INVENTORY TRACKING USING RFID

BACKGROUND

Materials handling facilities such as warehouses or retail stores often store or display items in a hanging fashion. For example, a materials handling facility may include structural features such as walls, gondola racks, shelves or fixtures having bars, arms, hooks or other elements from which available items may be suspended, dangled or hung, and displayed to users (e.g., workers or customers) of the materials handling facility. Where an item or a container in which the item is maintained includes a hole, a slot or another opening, or multiple holes, slots or openings that are commonly aligned, a support bar (or support arm) may be extended through the hole or holes, and the item may be suspended from the support bar accordingly.

Suspending items from a support bar or like element provides a number of advantages. For example, one or more items that lack a flat surface upon which the items may rest or stand may be stored in tandem by hanging the items from a support bar, such that the bar above the item, rather than a shelf or other flat surface beneath the item, provides support for the weight of the items. The same support bar may be utilized to suspend items of varying sizes, shapes or masses, so long as such items or their containers include one or more openings having internal diameters or other dimensions corresponding to the external diameter or other dimension of the support bar. Moreover, in some instances, support may be releasably mounted to pegboards, panels or other structural features provided within inventory areas in a manner that enables one or more of the bars to be quickly and easily placed in different locations. Some such structural features may be configured to accommodate support bars in any number of predetermined locations in three-dimensional space within a materials handling facility, with such locations being defined based on the sizes or dimensions of the respective items to be suspended therefrom.

Today, the use of support bars or other like elements to suspend items in a materials handling facility has a number of drawbacks, however. For example, because any number of items may be provided on a common support bar in a row or series, a user of a materials handling facility may not become aware that the facility's inventory of a given item is depleted until the final item in the row or series is removed from the support bar. Additionally, determining an inventory or performing an accounting of the number or type of available items suspended from support bar may usually only be conducted by a visual inspection, e.g., by manually evaluating and counting each of the items suspended on the bar. While items are sometimes suspended from a support bar in a homogenous manner, e.g., such that each of the items suspended from the bar is identical or fungible, the actual contents of the bar may not be confirmed without performing a visual inspection.

BRIEF DESCRIPTION OF THE DRAWINGS

FIGS. 2A through 2D are views of components of one system for inventory tracking using RFID in accordance with implementations of the present disclosure.

FIGS. 6A and 6B are views of components of one system for inventory tracking using RFID in accordance with implementations of the present disclosure.

DETAILED DESCRIPTION

As is set forth in greater detail below, the present disclosure is directed to systems and methods for tracking inventory in materials handling facilities or like environments using radio frequency identification (or "RFID") systems and technologies. More specifically, the systems and methods of the present disclosure are directed to storage units or apparatuses to be installed into pegboards or other structures provided in inventory areas. Such storage units or apparatuses include support bars, arms, hooks or other elements from which items may be suspended, and RFID reading systems or components (e.g., an RFID antenna in communication with an RFID reader) provided within a close proximity of the support bars or other like elements.

Figure 1A:
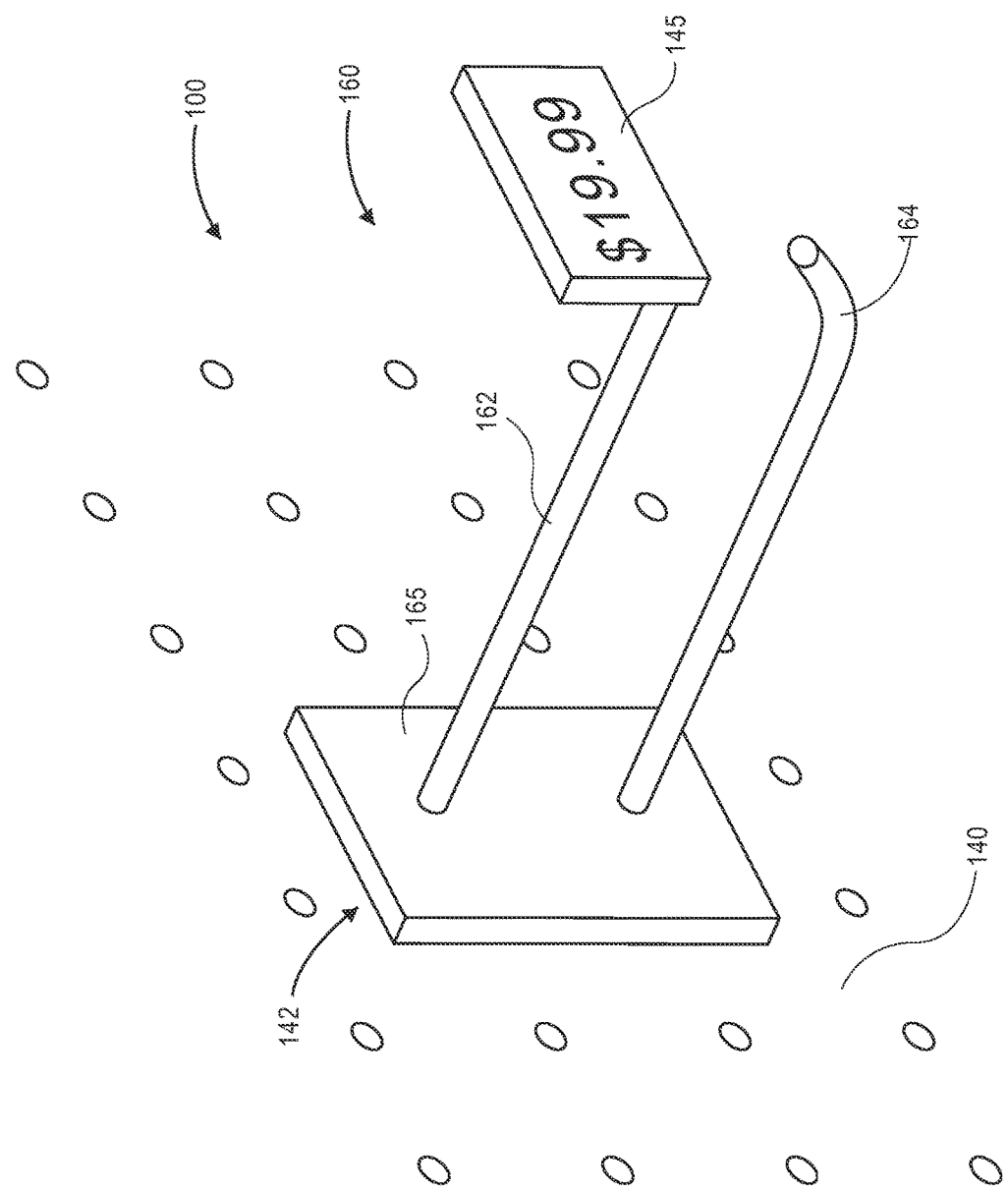
FIGS. 1A through 1D are views of components of one system for inventory tracking using RFID in accordance with implementations of the present disclosure.

Referring to FIGS. 1A through 1D, a system 100 for inventory tracking using RFID in accordance with implementations of the present disclosure is shown. As is shown in FIG. 1A, the system 100 includes a pegboard 140 and a storage unit 160 mounted to the pegboard 140 via a base 165. The pegboard 140 may be all or a portion of a panel, a wall, a gondola rack, a shelf or another fixture or structural element within an inventory area. The storage unit 160 includes an RFID antenna 162 and a support bar 164. The RFID antenna 162 is joined to the base 165 at a proximal end thereof and includes a placard 145 including information regarding the item 150. The RFID antenna 162 may be configured to emit electric fields or magnetic fields and to receive RFID signals transmitted by RFID tags provided within the presence of such fields. The placard 145 may include any information regarding the item 150, including but not limited to a cost, a name or other identifier of the item 150, a bar code (e.g., a one-dimensional or a two-dimensional, or "QR," code), or any other relevant information or data. The support bar 164 includes a first section joined to the base 165 at a proximal end thereof in parallel with the RFID antenna 162, and a second section bent or canted upward by an acute angle at a free, distal end thereof. An RFID reader 142 including circuits or other components (not shown) for interpreting contents of RFID signals received by the RFID antenna 162 may be provided in association with the storage unit 160, e.g., embedded within the base 165, or external to the storage unit 160, and is electrically coupled to the RFID antenna 162.

Figure 1C:
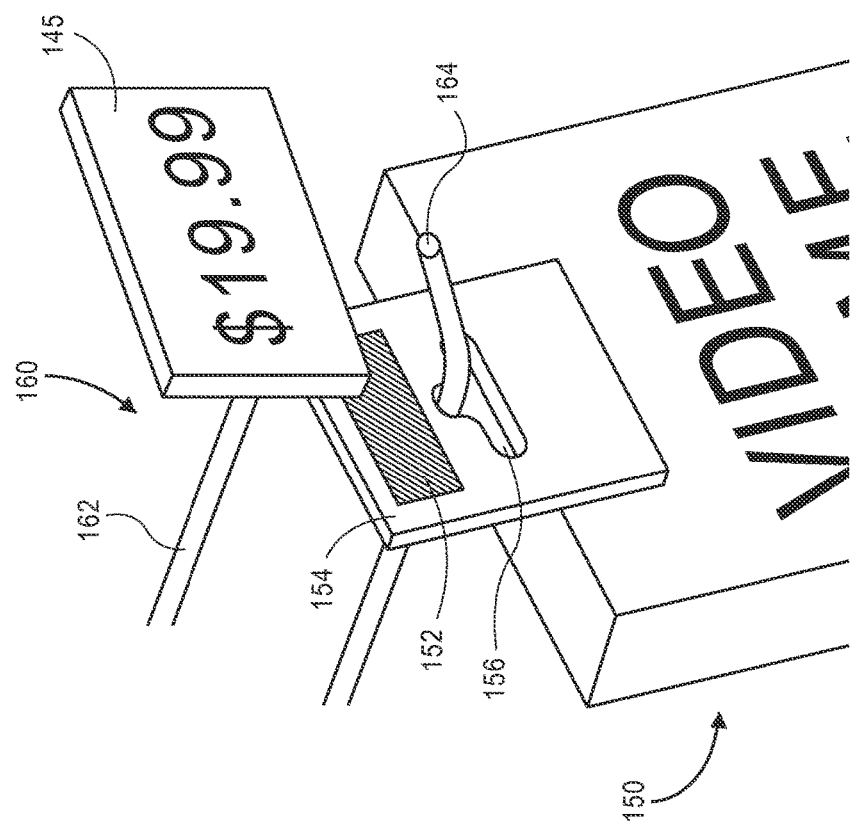
Figure 1B:
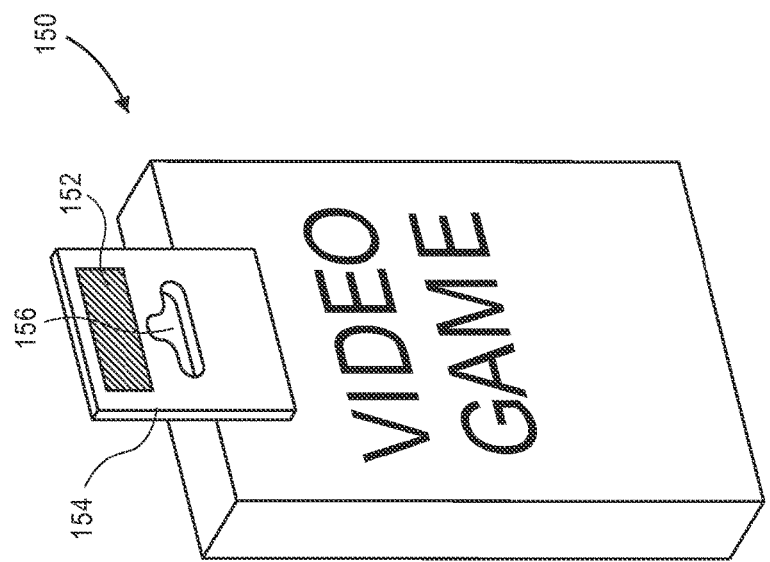

As is shown in FIG. 1B, an item 150 includes an RFID tag 152 and a hanging tab 154. The RFID tag 152 may be adhered to an upper portion of the hanging tab 154 in any manner, or incorporated or embedded therein. The hanging tag 154 may itself be adhered to, incorporated into or embedded into the item 150 by any means, and may be formed from any sufficiently durable material. The hanging tag 154 includes a slot 156 for accommodating an arm or other element therethrough in a lower portion.

The storage unit 160 may be configured to receive and store one or more items, such as the item 150, within an inventory area. In particular, the item 150 may be suspended from the storage unit 160. Referring to FIG. 1C, the item 150 is shown as being placed on the storage unit 160. As is shown in FIG. 1C, the free end of the support arm 164 is extended through the slot 156 of the hanging tab 154, which may be bent or folded, if necessary, in order to allow the hanging tab 154 to pass beneath the placard 145 and onto the support arm 164. Once the support arm 164 has been extended through the slot 156, the item 150 may be slid or translated to any position along the support arm 164, and suspended therefrom.

Figure 1D:
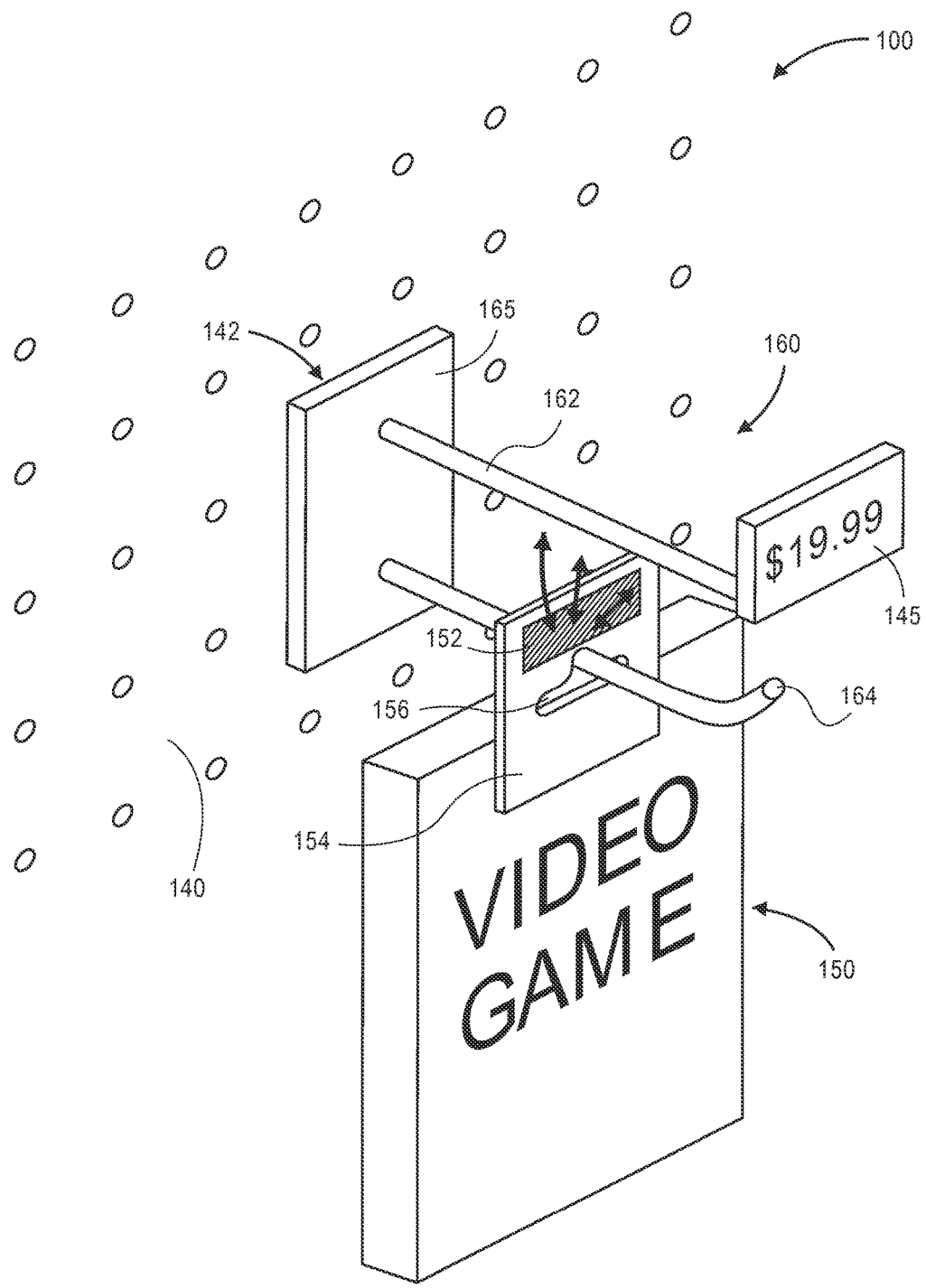

In accordance with the present disclosure, when the item 150 is within a vicinity of the RFID antenna 162, the item 150 may be sensed and recognized based on an RFID signal transmitted from the RFID tag 152 to the RFID antenna 162. The RFID signal may contain any type or form of information, data or metadata stored in a microchip or other memory component of the RFID tag 152 and transmitted to the RFID antenna 162 when the RFID tag 152 senses radiofrequency ("RF") energy emitted by the RFID antenna 162 (e.g., an electric field and/or a magnetic field). Referring to FIG. 1D, the item 150 is shown suspended from the support arm 164, as RFID signals including information, data or metadata is transmitted by the RFID tag 152 to the RFID antenna 162. Based on the information, data or metadata included in the RFID signal, the RFID reader 142 may detect that the item 150 has been deposited on or is otherwise resting on the support bar 164. Because the upper portion of the hanging tab 154, which includes the RFID tag 152, is located above the rest of the item 150 and within a close proximity of the RFID antenna 162, the electromagnetic field is tightly coupled between the RFID tag 152 and the RFID antenna 162, thereby limiting the read range and power required in order to transmit the RFID signal, and minimizing any "cross talk" between the RFID tag 152 and any other RFID antennas (not shown) that may be nearby within the inventory area, or between any other RFID tags (not shown) that may be nearby within the inventory area and the RFID antenna 162.

Accordingly, the systems and methods of the present disclosure are directed to tracking inventories of items that are suspended from a support bar (or support arm) or like elements using RFID systems and technologies. A storage unit may include an RFID antenna and/or reader provided within a particular range of a support bar or like element may sense and recognize an item having an RFID tag that is placed thereon based on an RFID signal transmitted by the RFID tag to the RFID antenna. Storage units of the present disclosure may thus constructed in a controlled geometric relationship that enables a tightly coupled RFID connection between RFID tags borne by items suspended from a support bar or like element and an RFID antenna provided within a predefined range of the support bar or like element. The geometric relationship thus increases the likelihood that the RFID tags borne by such items will transmit RFID signals of sufficient strengths to the RFID antenna provided within the predefined range of the support bar, and that such signals will be received by the RFID antenna, and by no other RFID antennas.

In some implementations, the RFID antenna may define or be a component part of a "leaky" coaxial transmission line including one or more shielding components that enable all or portions of RF energy fields (e.g., electric or magnetic fields) to be emitted in one or more directions toward any items that may be disposed upon a support bar or like element, while blocking or redirecting RF energy fields from being emitted in other directions. Further, an RFID reader may include circuitry components such as a phase shifter that cause the phases of the electromagnetic fields emitted by the RFID antenna to vary in their relative location with respect to the support bar or like element. Varying the phases of the electromagnetic fields increases the likelihood that RFID tags positioned in any location with respect to the support bar may transmit a sufficiently strong RFID signal to the RFID antenna in at least one of the phases. Using the strengths of the RFID signals transmitted by an RFID tag when the RFID tag is within the presence of the fields in various phases, a location of an item bearing the RFID tag along the support bar or like element may be predicted or determined.

Materials handling facilities are centers of activity where items may be received from any number of sources, stored, prepared for delivery and/or delivered to any number of destinations. The term "materials handling facility" may include, for example, warehouses, distribution centers, cross-docking facilities, order fulfillment facilities, packaging facilities, shipping facilities, rental facilities, libraries, retail stores or establishments, wholesale stores, museums, or other facilities or combinations of facilities. In some implementations, a materials handling facility may include one or more receiving stations or docks at which shipments of items may be received by any delivery means, as well as one or more versatile storage areas or regions having aisles, rows, bays, shelves, slots, bins, racks, tiers, bars, hooks, cubbies or other like storage means arranged in a fixed or flexible two-dimensional or three-dimensional architecture or layout, and one or more distribution stations or docks from which shipments of items may be delivered by any delivery means. The various areas or regions of a materials handling facility may be accessed by human operators or machines, which may receive and place items within such areas or regions upon their arrival, and retrieve and prepare such items for departure within such areas or regions.

A pegboard is a planar sheet or panel of a substantially hard metal, wood, plastic or composite material having a regular pattern of holes for receiving one or more pegs therein. The pegs may be mounted to or component parts of one or more storage units that are configured to store and/or hang objects such as items, tools or utensils therefrom. When an arm, a bar, a hook or another element having one or more pegs may be inserted into the holes of the pegboard either singly or in accordance with the regular pattern thereon, and one or more objects may be suspended therefrom. A pegboard thus provides a simple and efficient way to customize an inventory area or storage area within a materials handling facility for suspending or hanging objects. One or more bars, arms, hooks or other elements may be installed into the pegboard, in any number of locations or combinations of locations, at a comparatively low cost.

RFID refers to a wireless, non-contacting system for transferring data by way of radio frequency (or "RF") electromagnetic fields. In an RFID system, data transfers occur in the form of modulated signals transmitted between an RFID tag (or an RFID device), which may include various communication components, logic or circuitry, and an RFID reader or reading system, which may include one or more antennas or other like devices. Data stored within a microchip or other memory component or storage device associated with the RFID tag may be sent to the RFID reader, which may interpret not only the data or other contents received in the RFID signal but also other relevant information or attributes of the RFID signal, e.g., an intensity or a frequency of the RFID signal, as well as a direction from which the RFID signal originated, a range traveled by the RFID signal or metadata associated with the transmission of the RFID signal. The transfer of the RFID signal is initiated when an RFID tag senses an electric field and/or a magnetic field emitted by an RFID reader, e.g., by an RFID antenna associated with the RFID reader. The RFID signal includes information or data that may be stored in association with the RFID tag in one or more microchips or other storage devices. A strength of an RFID signal transmitted by an RFID tag to an RFID antenna is a function of a strength of the electromagnetic field received by the RFID tag from the RFID antenna, as well as a distance between the RFID tag and the RFID antenna, any gains associated with either the RFID tag or the RFID antenna, and a wavelength or frequency of the electromagnetic field.

RFID-based communication systems provide a number of advantages over similar systems or methods for performing the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between one and one hundred centimeters, or 1-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When a capacitively coupled RFID tag is placed in sufficiently close proximity to an RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags may have more limited operating ranges than inductively coupled RFID tags and may be typically employed in near-field communication environments. Similarly, a backscatter-coupled RFID tag receives power emitted from an RFID antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present disclosure.

In addition to RFID tags which are automatically coupled with an RFID reader, the systems and methods of the present disclosure may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

In some implementations, capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

According to some implementations of the present disclosure, an item bearing an RFID tag may be suspended from a storage unit having a support bar (or support arm) and an RFID antenna provided within a predefined range of the support bar, which may sense the presence of the RFID tag and, therefore, the item on the support bar. The support bars and RFID reading systems or components may be releasably or adjustably mounted to traditional or existing components of a materials handling facility, including but not limited to a pegboard (e.g., a perforated hardboard, sometimes called a "perfboard"), a panel, a wall, a gondola rack, a shelf or another fixture or structural component within an inventory area of the materials handling facility. The support bars and RFID reading systems or components may feature one or more other traditional or existing components commonly encountered within a materials handling facility, including but not limited to price tags, labels, identifiers or supports for such components, such as the placard 145 or any other like components. The support bars and the RFID antennas may extend from surfaces of such fixtures or components in a perpendicular or substantially perpendicular fashion or, alternatively, at an upward or downward angle with respect to such surfaces.

Because the storage units of the present disclosure may be releasably or adjustably installed on one or more surfaces of an inventory area, the storage units enable a materials handling facility to customize not only an orientation, a placement or a configuration of the inventory area but also a manner in which the inventory area may receive and store items. In accordance with the present disclosure, a support bar may be formed from any material of sufficient strength, rigidity or durability, including but not limited to plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. The support bar may be provided in association with an RFID antenna or RFID reader operating in any mode, and utilized in connection with any type, form or kind of RFID tags, including but not limited to RFID tags that are inductively coupled or capacitively coupled. Any type, form or kind of item may be suspended from the support bar, or from two or more support bars.

According to some other implementations of the present disclosure, a storage unit may include a "leaky," or less than fully coaxial, transmission line provided in association with a support bar or support arm. The transmission line may include an RFID antenna and one or more shields that reflect or radiate radiofrequency ("RF") energy emitted by the RFID antenna in a specific direction, viz., toward the support bar or support arm with which the RFID antenna is associated, and away from one or more other support arms or bars. By shielding a substantially linear antenna to reflect or redirect RF energy toward a support bar or support arm, the transmission line may increase the efficiency by which RFID signals are received from RFID tags of items provided on the support bar or support arm, while reducing the amount of "cross talk," or RFID signals received from other RFID tags, e.g., RFID tags borne by items provided on other support bars or support arms. Additionally, the transmission lines may enable the amount of RF energy required to be emitted in order to sense and identify items bearing RFID tags provided on the support bar or support arm to also be reduced, thereby further minimizing the risks of falsely sensing or identifying an item that is provided on another support bar or support arm. In addition to the RFID antenna, the storage unit may include one or more additional RFID reading components for receiving and interpreting contents of RFID signals, which may be powered externally or by one or more local power sources.

According to other implementations of the present disclosure, a storage unit may include one or more pegs or other extensions, and a pegboard or other fixture or component within an inventory area may include an array of holes or other openings, or a series of knuckles or sheaths, that are aligned to receive the pegs or extensions of the storage unit in any number of locations thereon. In some implementations, RFID reading systems or components may include circuits configured to determine whether a storage unit has been installed on a pegboard, a panel, a wall, a gondola rack, a shelf or another fixture or structural component, or a location on the pegboard, the panel, the wall, the gondola rack, the shelf or the other fixture or structural component where the storage unit has been installed.

According to still other implementations of the present disclosure, the RFID reading systems or components may further include circuitry or components, e.g., a phase shifter, that are configured to change the inductance of an RFID antenna, thereby causing a phase of an electromagnetic field emitted by the RFID antenna to vary with respect to its length. Because the strength of an RFID signal emitted by an RFID tag within the presence of an electromagnetic field is typically dependent upon the strength of the electromagnetic field, varying the phase of the electromagnetic field at various intervals of time, e.g., by phase angles of up to ninety degrees (90°) or one hundred eighty degrees (180°) in either direction with respect to a length of the RFID antenna at predetermined intervals, increases the likelihood that RFID signals of sufficient strength will be transmitted by RFID tags borne by each of the items suspended from a support bar or support arm within a predefined range of the RFID antenna, regardless of where an RFID tag is located on the support bar. For example, shifting a phase of a rectified standing wave of an electromagnetic field back and forth with respect to the length of the RFID antenna causes points of peak amplitude and points of minimum amplitude (e.g., peaks and valleys) of the rectified standing wave to move along the length of the RFID antenna, ensuring that points where the strength of the electromagnetic field is at a minimum, e.g., points of minimum amplitude of the rectified standing wave, never remain in the same place on the support bar for an extended duration, and that every RFID tag borne by every item suspended from the support bar experiences a sufficiently strong electromagnetic field to cause an RFID signal to be emitted thereby Where a strength of an RFID signal transmitted by an RFID tag to an RFID antenna remains above a threshold or limit for a predetermined period of time, an item bearing the RFID tag may be determined to be suspended from a support bar provided within the predefined range of the RFID antenna. Varying the phase of the electromagnetic field may also enable a location of an item bearing an RFID tag on a support bar or arm to be determined or predicted based on the strengths of RFID signals received from the RFID tag.

According to other embodiments of the present disclosure, one or more inventory or accounting methods may be performed using RFID reading systems or components having an RFID antenna provided within a predefined range of a support bar or arm with one or more items bearing RFID tags suspended therefrom. Such methods may sense an arrival of an item on a support bar or arm, and identify the item that has arrived, based on an RFID signal transmitted by an RFID tag associated with the item. Such methods may also sense a departure of an item from a support bar or arm, and identify the item that departed, based on a loss of an RFID signal that had been transmitted by an RFID tag associated with the item. Such methods may further identify each of the items suspended from a support bar or arm based on the presence of RFID signals transmitted by RFID tags associated with such items. Such methods may likewise determine the locations of such items along the support bar or arm by evaluating the locations or strengths of RFID signals emitted from their corresponding RFID tags at various times, or determine the location of a storage unit including the support bar or arm from which such items are suspended using a sensing circuit that is configured to emit discrete signals indicating when the storage unit is installed on a fixture or structural element, or the location of the storage unit on the figure or other structural element. General or specific information regarding the items suspended from a support bar of a storage unit, or from support bars of any number of storage units within an inventory area or a materials handling facility, may be made available to any number of entities. For example, such information may be accessed by workers, owners or operators of the materials handling facility; by one or more vendors who provided items to the materials handling facility; by computer systems associated with an online marketplace that offers items for purchase from the materials handling facility, e.g., over the Internet; or by one or more customers who access network sites or other sources of information regarding items that are available at the materials handling facility, e.g., over the Internet.

Referring to FIGS. 2A through 2D, views of components of one system 200 for inventory tracking using RFID in accordance with implementations of the present disclosure are shown. Except where otherwise noted, reference numerals preceded by the number "2" shown in FIGS. 2A through 2D indicate components or features that are similar to components or features having reference numerals preceded by the number "1" shown in FIGS. 1A through 1D.

Figure 2A:
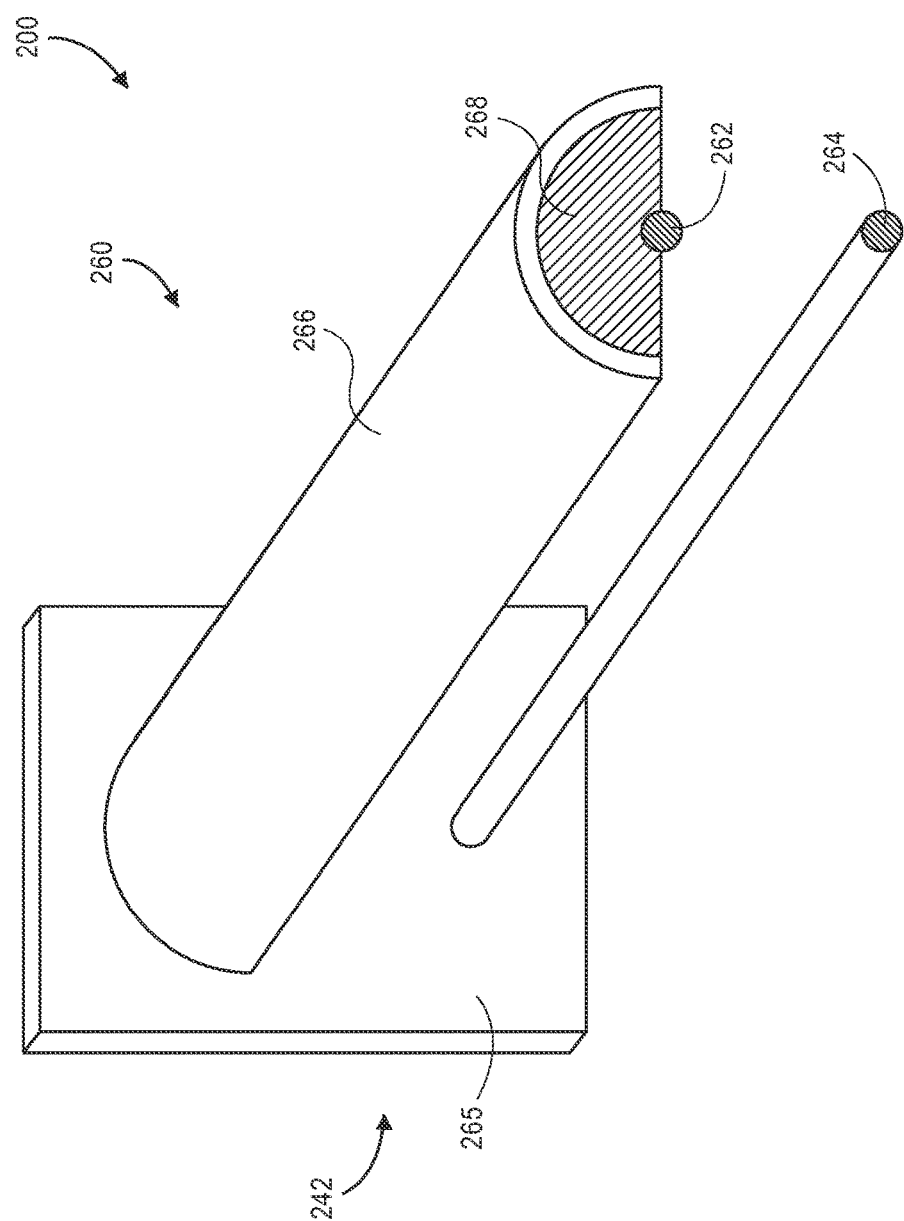

As is shown in FIGS. 2A and 2B, the system 200 includes a storage unit 260 having an RFID antenna 262, a support bar 264, a shield 266 and a dielectric buffer 268 that are mounted to a base 265, which may further include one or more RFID reading components 242 (not shown). As is also shown in FIGS. 2A and 2B, the RFID antenna 262 and the support bar 264 extend substantially normal to and in parallel from the base 265, with lengths that are substantially equal to one another. The RFID antenna 262 and the support bar 264 are separated by a distance, viz., $\Delta h_{MOUNT}$, on the base 265 and along their respective lengths. Although the RFID antenna 262 and the support bar 264 are shown as extending substantially normal to the base 265, the RFID antenna 262 and the support bar 264 may be provided at any other angles, e.g., upward or downward with respect to the base 265, in accordance with the present disclosure.

The RFID antenna 262 is shaped in the form of a rod having a homogenous and substantially cylindrical cross-section, and may be formed from any suitable conductive material including but not limited to metals such as aluminum or copper, with dimensions that are selected based on the specific application in which the storage unit 260 is to be utilized. Likewise, the support bar 264 is also shaped in the form of a rod having a homogenous and substantially cylindrical cross-section that corresponds to the cross-section of the RFID antenna 262, and may be formed from any sufficiently strong or durable materials, e.g., plastics, woods, metals, composites or combinations of materials, also with dimensions that are selected based on the specific application in which the storage unit 260 is to be utilized. For example, where the storage unit 260 is intended to support large or heavy items, or items in large numbers, the support bar 264 may have a large cross section, or be formed from materials that may support greater weights on the support bar 264 and resist greater forces of shear or moments about the junction of the support bar 264 with the base 265. In other implementations, however, where the storage unit 260 is intended to support smaller or lighter items, or items in smaller numbers, the strength of the materials from which the support bar 264 is formed, or the capacity of the support bar 264 to resist shear or moments, may be less essential. Moreover, in some other implementations, the RFID antenna 262 or the support bar 264 may have any other cross-section, or may have different lengths, and may also be provided in parallel or with one or more bends or cants, such as the support bar 164 of FIGS. 1A, 1C and 1D, which has a bent free end that extends beyond the placard 145 at an acute angle. The support bar 264 may also include one or more raised or lowered features (e.g., bumps or notches), which may resist movement by and/or accommodate any items suspended from the support bar 264.

The shield 266 enables RF energy emitted by the RFID antenna 262 to be directed toward the support bar 264 and any items suspended therefrom, while blocking, inhibiting and/or attenuating RF energy emitted by the RFID antenna 262 from reaching any other items bearing RFID tags that are suspended from other support bars (not shown) within a vicinity of the storage unit 260, e.g., above the storage unit 260. As such, the shield 266 extends around at least a portion of a circumference of the RFID antenna 262 and defines a leaky transmission line that freely emits RF energy from the RFID antenna 262 in a preferred direction, viz., away from the shield 266 and toward the support bar 264, while resisting the emission of RF energy in other directions. The shield 266 may be formed from any suitable material for blocking, inhibiting or attenuating electromagnetic fields, including but not limited to metals such as aluminum or steel, or any other suitable materials. The dielectric buffer 268 is provided between the RFID antenna 262 and an inner surface of the shield 266, and ensures that RF energy emitted by the RFID antenna 262 does not contact any RFID tags other than those that are associated with items suspended from the support bar 264. The dielectric buffer 268 may also be formed from any suitable dielectric materials to block, inhibit or attenuate electromagnetic fields, including plastics such as acrylic or acrylonitrile butadiene styrene ("ABS"), or other materials including but not limited to paper, polyamides, polycarbonates, polychloroprenes, polyesters, polyethylnenes, polypropylenes, polystyrenes, polytetrafluoroethylenes (PTFE), polyvinyl chlorides, porcelains, resins, rubbers, silicon, silicones, styrenes, waxes or any other suitable materials. While neither the shield 266 nor the dielectric buffer 268 is not essential in for electromagnetic fields to be emitted toward the support bar 264 and any items bearing RFID tags provided thereon, the dielectric buffer 268 may also provide enhanced structural support for the shield 266 above the RFID antenna 262 and may further maintain the separation between and alignment of the shield 266 and the RFID antenna 262 with respect to one another, along their respective lengths.

The construction of the storage unit 260 of FIGS. 2A and 2B in general, and the distance $\Delta h_{MOUNT}$ between the RFID antenna 262 and the support bar 264 in particular, may be chosen to ensure that RFID signals are reliably transmitted by RFID tags adorned by each of the items suspended from the support bar 264 in response to RF energy emitted by the RFID antenna 262, and reliably received at the RFID antenna 262, in a tightly coupled fashion while also minimizing the risk that RFID signals are transmitted to the RFID antenna 262 by any other RFID tags adorned by any other items suspended from any other support bars (not shown) or provided in any other location in response to the RFID energy emitted by the RFID antenna 262. In accordance with the present disclosure, RFID tags adorned by such items may also be constructed based on similar criteria.

Referring to FIG. 2C, a support hook 250 includes an RFID tag 252 provided on a substrate 254, an opening 256 within the substrate 254 and a slot 258 extending through the substrate 254. The RFID tag 252 may be any type or form of RFID component configured to transmit RFID signals when the RFID tag 252 is within the presence of RFID energy emitted by an RFID reading system or component, such as the RFID antenna 262 of the storage unit 260 of FIGS. 2A and 2B. The substrate 254 may be formed from any suitable materials, e.g., metals, plastics, woods, composites or other materials, that may adequately support one or more items provided within the slot 258 when a support bar or arm, such as the support bar 264 of FIGS. 2A and 2B, is placed within the opening 256. For example, where one or more items (not shown) is provided within the slot 258, the support hook 250 may thereby enable the one or more items to be suspended from the support bar 264, and RF energy emitted by the RFID antenna 262 may cause the RFID tag 252 to transmit an RFID signal identifying such items to the RFID antenna 262.

As is shown in FIG. 2C, the RFID tag 252 has a height $\Delta h_{TAG}$ within the substrate 254, and is adhered to the substrate 254, or incorporated or embedded therein, between the opening 256 and an upper edge of the substrate 254 in any manner. In accordance with some embodiments of the present disclosure, the height $\Delta h_{TAG}$ and the placement of the RFID tag 252 within the substrate 254 may be determined based at least in part on the distance $\Delta h_{MOUNT}$ between the RFID antenna 262 and the support bar 264 of the storage unit 260, for example, to achieve a tightly coupled RFID connection between the RFID tag 252 and the RFID antenna 262.

Figure 2D:
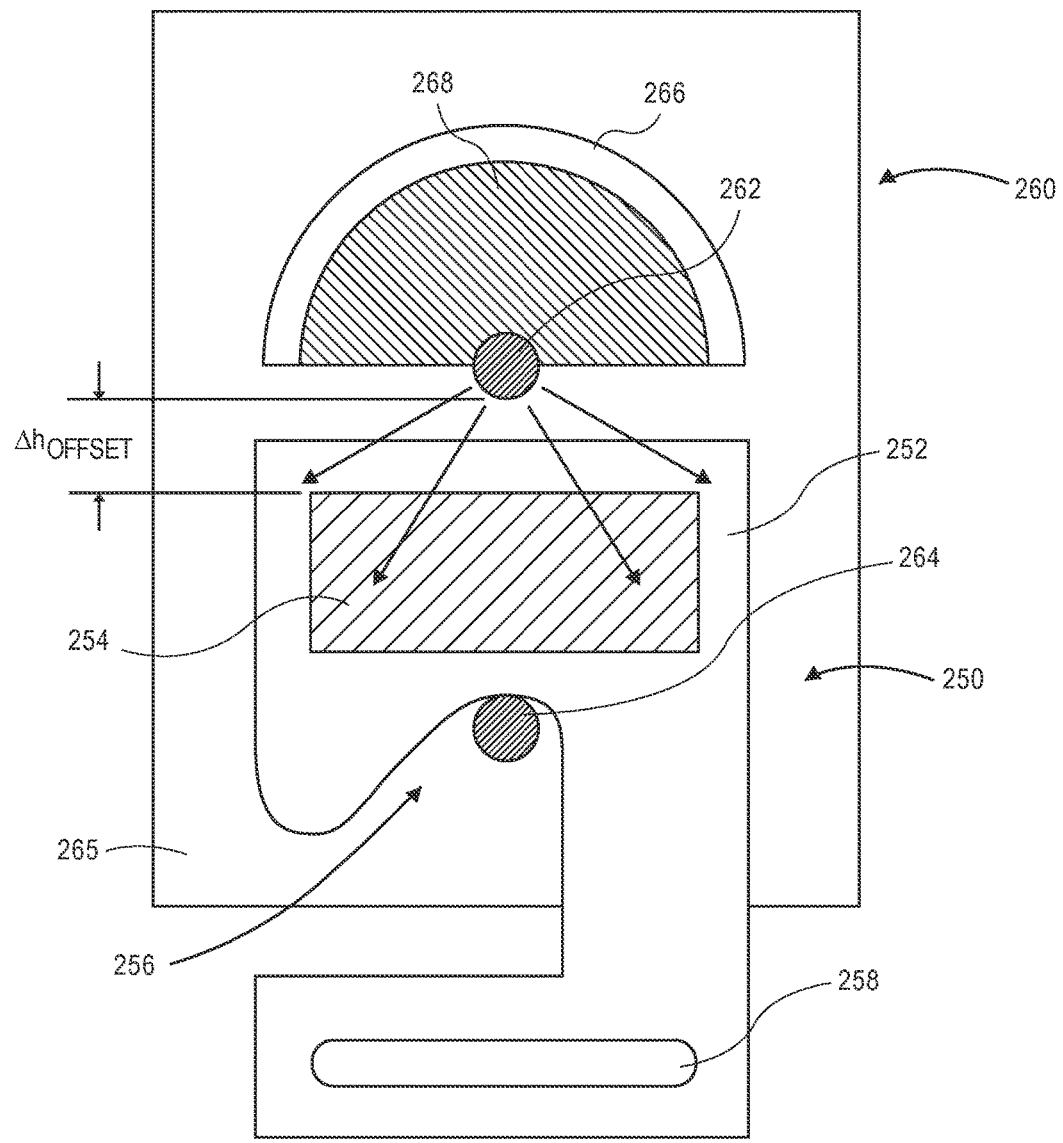

For example, as is shown in FIG. 2C, the height $\Delta h_{TAG}$ and the placement of the RFID tag 252 may be selected to ensure that the RFID tag 252 remains not less than, yet not more than, a distance $\Delta h_{OFFSET}$ from the RFID antenna 262 when the support hook 250 is suspended from the support bar 264, such as is shown in FIG. 2D. The distance $\Delta h_{OFFSET}$ is intended to ensure that the RF energy emitted by the RFID antenna 262 is tightly coupled with the RFID tag 252 at a sufficient strength, and that RFID signals emitted by the RFID tag 252 will be received at the RFID antenna 262. As is also shown in FIG. 2D, RF energy is emitted by the RFID antenna 262 in a downward direction, toward the support hook 250, such that little to none of the RF energy extends above and beyond the shield 266, e.g., to within a particular range of any other RFID tags associated with any other items, including but not limited to items that are provided on one or more other support bars (not shown) or stored in any other manner.

In accordance with implementations of the present disclosure, geometric relationships of RFID transmission lines that are provided in association with RFID antennas and storage units may be defined by shields and/or dielectric buffers that take any shape or form. The shapes or forms of the RFID transmission lines may be selected on any basis, including but not limited to cost considerations, structural requirements or design constraints. For example, where a storage unit is to be utilized in a dense environment, adjacent to or near other like storage units, or in close proximity to one or more other RFID tags, the storage unit may include substantially large or broadly encompassing shields and/or dielectric buffers that block or inhibit electromagnetic fields in many directions and permit electromagnetic fields to be emitted in one or few directions with respect to a circumference of an RFID antenna. Conversely, where a storage unit is to be utilized in a sparse environment, or far from other like storage units or RFID tags other than those that will be suspended therefrom, the storage unit need not include any shields or dielectric buffers, or may include shields or dielectric buffers that provide only limited coverage with respect to a circumference of the RFID antenna.

Figure 3A:
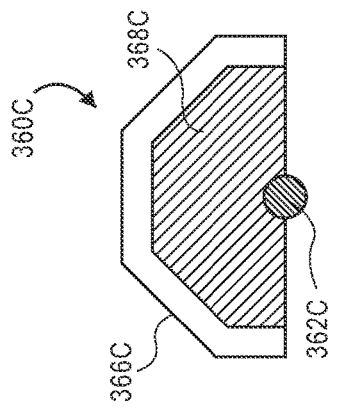
FIGS. 3A through 3C are views of components of systems for inventory tracking using RFID in accordance with implementations of the present disclosure.
Figure 3B:
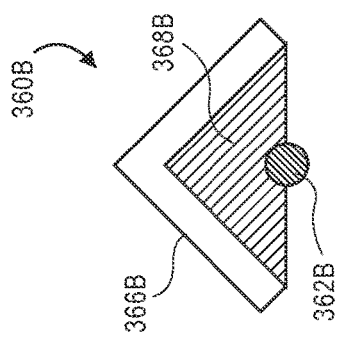
Figure 3C:
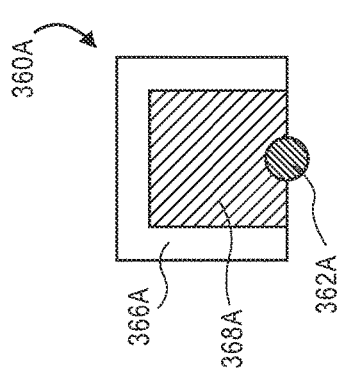

Referring to FIGS. 3A through 3C, views of components of systems for inventory tracking using RFID in accordance with implementations of the present disclosure are shown. Except where otherwise noted, reference numerals preceded by the number "3" shown in FIGS. 3A through 3C indicate components or features that are similar to components or features having reference numerals preceded by the number "2" shown in FIGS. 2A through 2D, or by the number "1" shown in FIGS. 1A through 1D.

As is shown in FIG. 3A, a storage unit 360A includes an RFID antenna 362A, a shield 366A and a dielectric buffer 368A. The shield 366A and the dielectric buffer 368A define a cross-section having a substantially square shape above the RFID antenna 362A, with the shield 366A corresponding to an upper surface of the cross-section that covers the dielectric buffer 368A on three sides, and the RFID antenna 362A is provided on a fourth side of the dielectric buffer 368A. The RFID antenna 362A, the shield 366A and the dielectric buffer 368A of the storage unit 360A thus define a leaky RFID transmission line that enables RF energy to be emitted from the RFID antenna 362A in a predetermined direction, e.g., toward an area below the RFID antenna 362A where a support bar or arm with one or more items bearing RFID tags (not shown) suspended therefrom may be provided, while resisting the emission of RFID energy in other directions, or causing RF energy emitted in such directions to be reflected downward the area below the RFID antenna 362A.

Similarly, FIG. 3B shows a storage unit 360B including an RFID antenna 362B, a shield 366B and a dielectric buffer 368B. The shield 366B and the dielectric buffer 368B define a cross-section having a substantially isosceles right triangular shape above the RFID antenna 362B, with the shield 366B corresponding to an upper surface of the cross-section that covers the dielectric buffer 368B on two equal sides, and the RFID antenna 362B is provided on the hypotenuse of the dielectric buffer 368B. The RFID antenna 362B, the shield 366B and the dielectric buffer 368B of the storage unit 360B thus define a leaky RFID transmission line that enables RF energy to be emitted from the RFID antenna 362B in a predetermined direction, e.g., toward an area below the RFID antenna 362B, while blocking the emission of RFID energy in other directions, or causing RF energy emitted in such directions to be reflected downward the area below the RFID antenna 362B. Likewise, FIG. 3C shows a storage unit 360C including an RFID antenna 362C, a shield 366C and a dielectric buffer 368C. The shield 366C and the dielectric buffer 368C define a cross-section having a six-sided shape of approximately half of a regular octagon above the RFID antenna 362C, with the shield 366C corresponding to an upper surface of the six-sided shape that covers the dielectric buffer 368C on the five sides corresponding to the half of the regular octagon, and the RFID antenna 362C is provided below the open surface of the cross-section. The RFID antenna 362C, the shield 366C and the dielectric buffer 368C of the storage unit 360C thus define a leaky RFID transmission line that enables RF energy to be emitted from the RFID antenna 362C in a predetermined direction, e.g., toward an area below the RFID antenna 362C, while resisting the emission of RFID energy in other directions, or causing RF energy emitted in such directions to be reflected downward the area below the RFID antenna 362C.

Figure 4A:
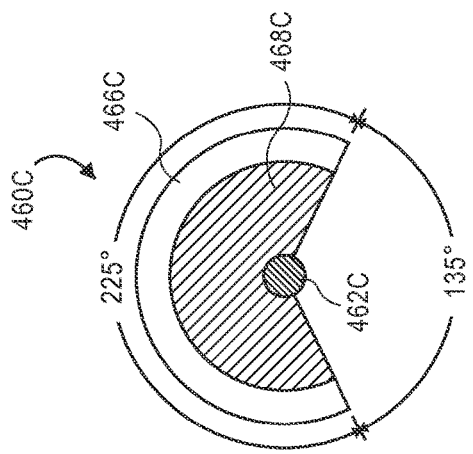
FIGS. 4A through 4C are views of components of systems for inventory tracking using RFID in accordance with implementations of the present disclosure.
Figure 4B:
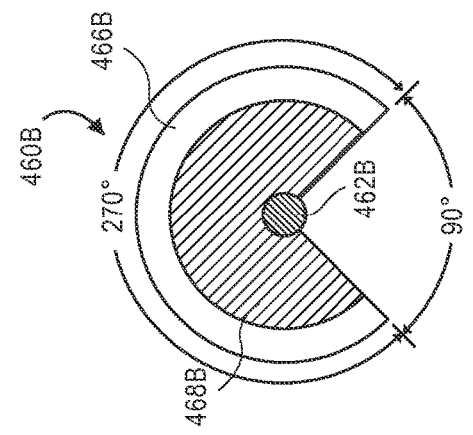
Figure 4C:
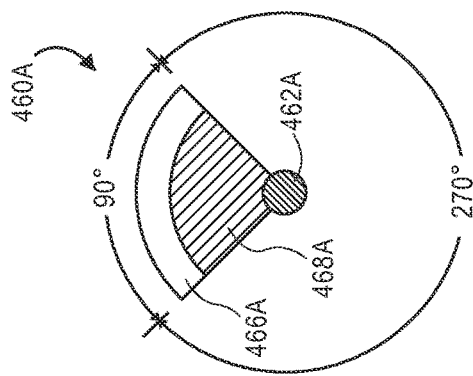

Referring to FIGS. 4A through 4C, views of components of systems for inventory tracking using RFID in accordance with implementations of the present disclosure are shown. Except where otherwise noted, reference numerals preceded by the number "4" shown in FIGS. 4A through 4C indicate components or features that are similar to components or features having reference numerals preceded by the number "3" shown in FIGS. 3A through 3C, by the number "2" shown in FIGS. 2A through 2D, or by the number "1" shown in FIGS. 1A through 1D.

FIGS. 4A, 4B and 4C depict RFID leaky transmission lines with RFID antennas, shields and dielectric buffers that provide varying degrees of coverage of the RFID antennas. As is shown in FIG. 4A, a storage unit 460A includes an RFID antenna 462A, a shield 466A and a dielectric buffer 468A. The shield 466A and the dielectric buffer 468A define a cross-section having a shape of a sector or other circular segment comprising an arc of approximately one-quarter of a circle, viz., ninety degrees (90°), above the RFID antenna 462A. The shield 466A thus corresponds to an upper surface of the cross-section, e.g., an arc of the circular segment, that covers the dielectric buffer 468A on the upper surface of the cross-section. The RFID antenna 462A is provided at a point corresponding approximately to a center of the cross-section. The RFID antenna 462A, the shield 466A and the dielectric buffer 468A of the storage unit 460A thus define a leaky RFID transmission line that covers approximately one-quarter, or ninety degrees (90°), of a circumference of the RFID antenna 462A and enables RF energy to be emitted radially from the RFID antenna 462A for three-quarters of the circumference, or two hundred seventy degrees (270°), including toward an area below the RFID antenna 462A where a support bar or arm with one or more items bearing RFID tags (not shown) suspended therefrom may be provided, while resisting the emission of RFID energy in a specific direction, viz., the ninety degree (90°) circumferential segment directly above the RFID antenna 462A, or causing RF energy emitted in this direction to be reflected downward the area below the RFID antenna 462A.

Similarly, FIG. 4B shows a storage unit 460B including an RFID antenna 462B, a shield 466B and a dielectric buffer 468B. The shield 466B and the dielectric buffer 468B define a cross-section having a shape of a sector or other circular segment comprising an arc of approximately three-quarters of a circle, viz., two hundred seventy degrees (270°), above the RFID antenna 462B. The shield 466B thus corresponds to an upper surface of the cross-section, e.g., an arc of the circular segment, that covers the dielectric buffer 468B on an upper surface of the cross-section. The RFID antenna 462B is provided at a point corresponding approximately to a center of the cross-section. The RFID antenna 462B, the shield 466B and the dielectric buffer 468B of the storage unit 460B thus define a leaky RFID transmission line that covers approximately three-quarters, or two hundred seventy degrees (270°), of a circumference of the RFID antenna 462B and enables RF energy to be emitted radially from the RFID antenna 462B to the narrow ninety degree (90°) band not covered by the shield 466B, including toward an area below the RFID antenna 462B where a support bar or arm with one or more items bearing RFID tags (not shown) suspended therefrom may be provided, while resisting the emission of RFID energy in all other directions, viz., the two hundred seventy (270°) segment directly above the RFID antenna 462B, or causing RF energy emitted in this direction to be reflected downward the area below the RFID antenna 462B. Likewise, FIG. 4C shows a storage unit 460C including an RFID antenna 462C, a shield 466C and a dielectric buffer 468C. The shield 466C and the dielectric buffer 468C define a cross-section having a shape of a circular segment comprising an arc of approximately two hundred twenty-five degrees (225°) above the RFID antenna 462C. The shield 466C covers the dielectric buffer 468C on an upper surface of the cross-section, and the RFID antenna 462C is provided at a point corresponding approximately to a center of the cross-section. The RFID antenna 462C, the shield 466C and the dielectric buffer 468C of the storage unit 460C thus define a leaky RFID transmission line that covers approximately two hundred twenty-five degrees (225°), of a circumference of the RFID antenna 462C and enables RF energy to be emitted radially from the RFID antenna 462C to a one hundred thirty-five degree (135°) band not covered by the shield 466C, while resisting the emission of RFID energy in all other directions, viz., the two hundred twenty-five (225°) segment directly above the RFID antenna 462C, or causing RF energy emitted in this direction to be reflected downward the area below the RFID antenna 462C.

Figure 5A:
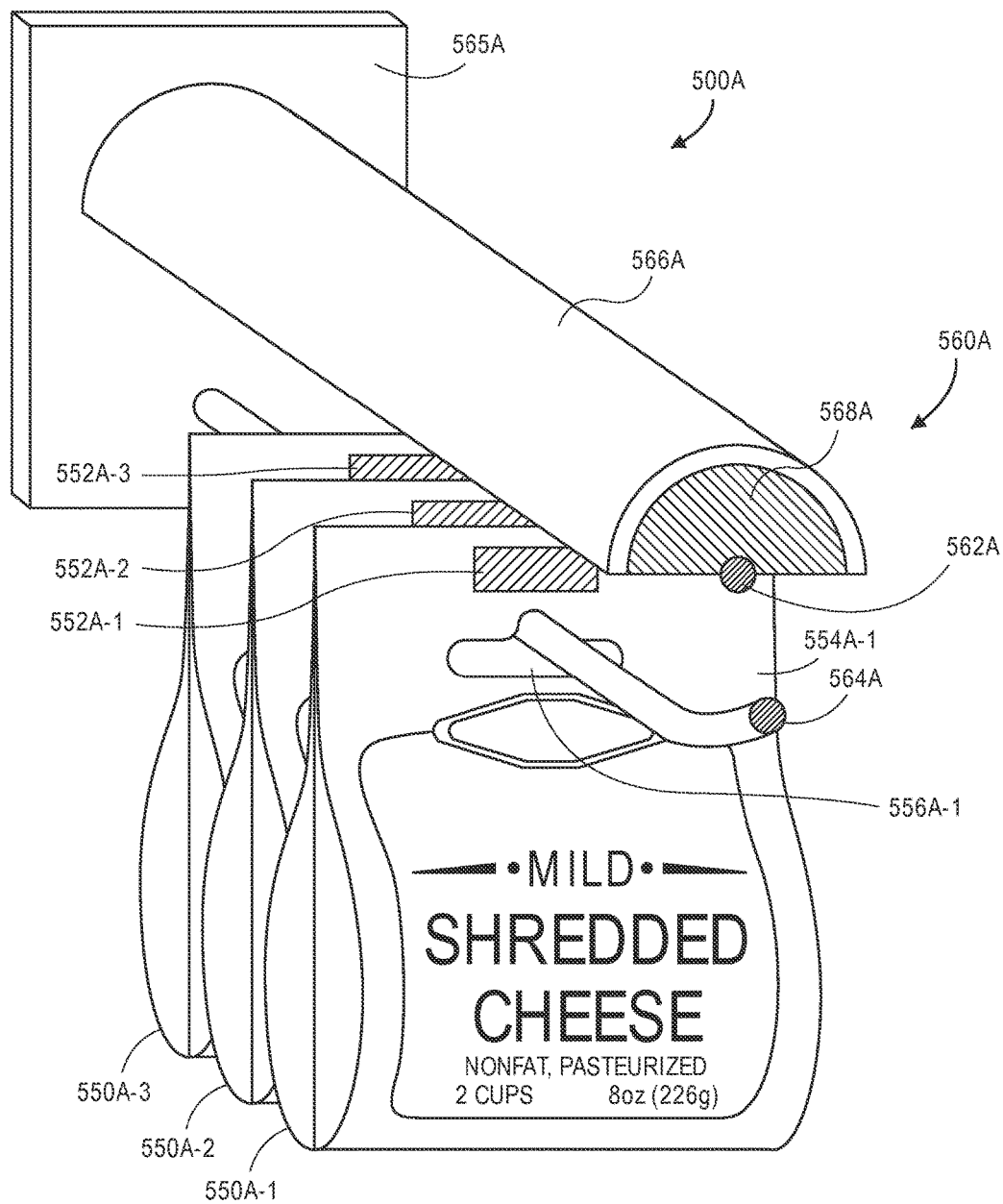
FIGS. 5A through 5C are views of components of systems for inventory tracking using RFID in accordance with implementations of the present disclosure.
Figure 5B:
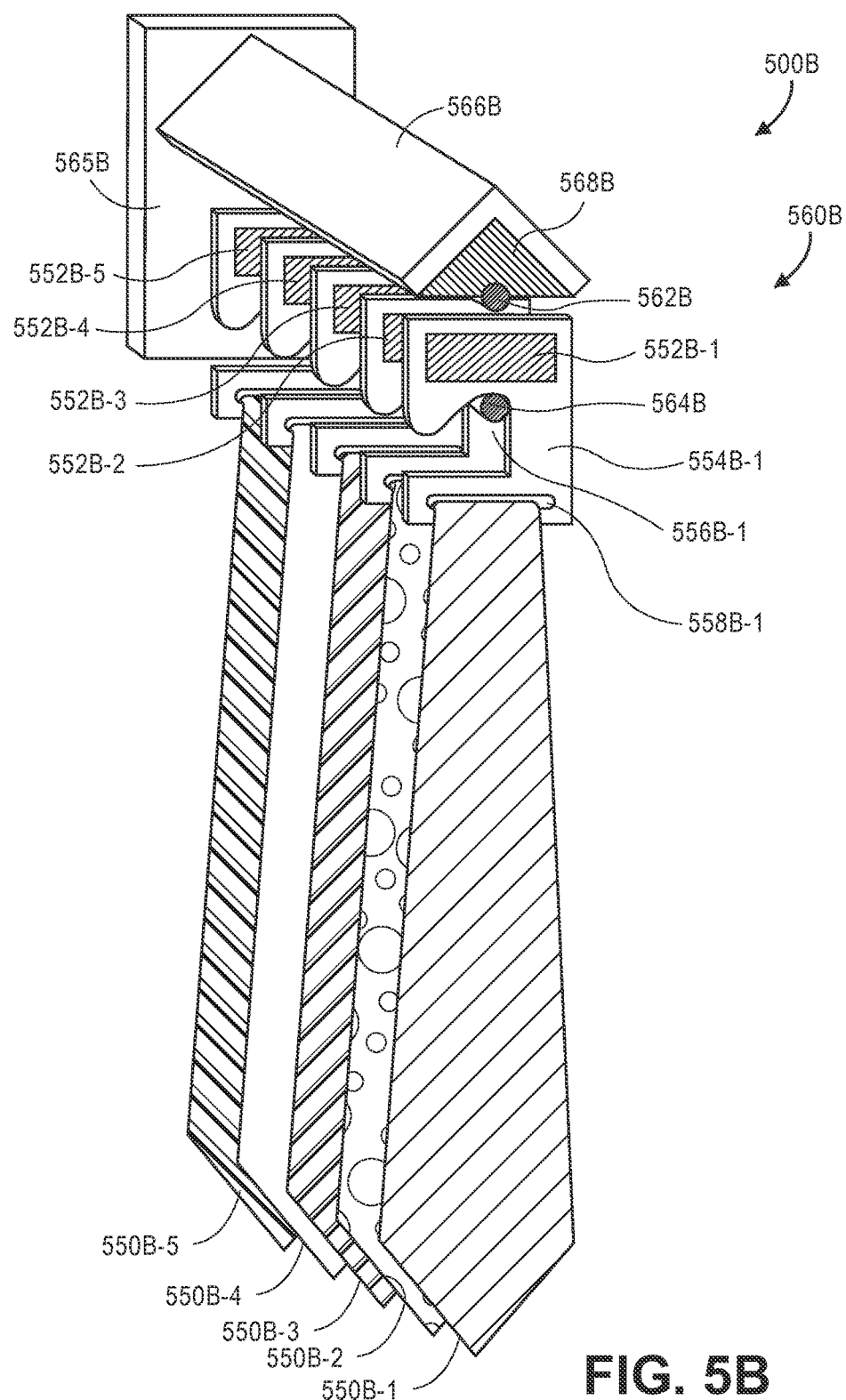
Figure 5C:
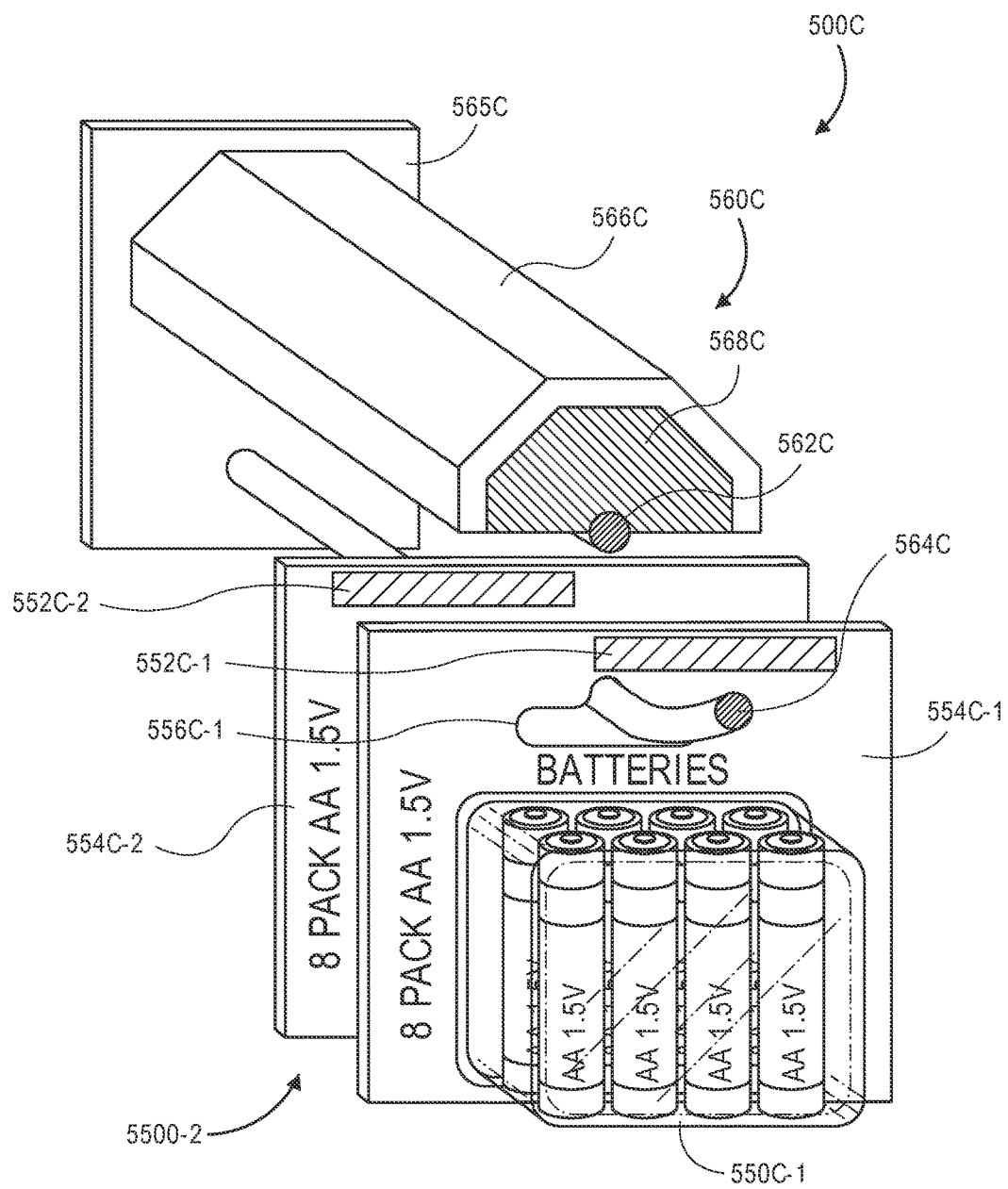

The systems and methods of the present disclosure may be utilized to receive and store items of any number or type in a suspended or hanging manner. Referring to FIGS. 5A, 5B and 5C, views of components of systems 500A, 500B, 500C for inventory tracking using RFID in accordance with implementations of the present disclosure are shown. Except where otherwise noted, reference numerals preceded by the number "5" shown in FIGS. 5A through 5C indicate components or features that are similar to components or features having reference numerals preceded by the number "4" shown in FIGS. 4A through 4C, by the number "3" shown in FIGS. 3A through 3C, by the number "2" shown in FIGS. 2A through 2D, or by the number "1" shown in FIGS. 1A through 1D.

As is shown in FIG. 5A, the system 500A includes a plurality of items 550A-1, 550A-2, 550A-3 suspended from a storage unit 560A. The items 550A-1, 550A-2, 550A-3 are bags of cheese, e.g., a food product produced from the milk of mammals such as cows, goats, sheep, buffalo, yak, camel or horses that contains water, fats, carbohydrates, proteins, phosphorous and calcium, and results in the formation of casein, a protein. As is shown in FIG. 5A, each of the items 550A-1, 550A-2, 550A-3 includes an RFID tag 552A-1, 552A-2, 552A-3 adhered to an extension 554A-1, 554A-2, 554A-3 and a slot 556A-1, 556A-2, 556A-3 extending through the extension 554A-1, 554A-2, 554A-3. As is also shown in FIG. 5A, the storage unit 560A includes an RFID antenna 562A, a support bar 564A, a shield 566A having a substantially semicircular shape and a dielectric buffer 568A provided between the RFID antenna 562A and the shield 566A. As is further shown in FIG. 5A, each of the items 550A-1, 550A-2, 550A-3 is suspended beneath the RFID antenna 562A by the support arm 564A, which extends through each of the slots 556A-1, 556A-2, 556A-3 provided in the extensions 554A-1, 554A-2, 554A-3.

Thus, as is shown in FIG. 5A, the systems and methods of the present disclosure may be utilized to receive, store and dispense any kind of items of any number and size, which may be suspended by a storage unit in series, and to perform any type of inventory tracking operations regarding the items using RFID systems and technologies. As is shown in FIG. 5A, when the items 550A-1, 550A-2, 550A-3 are suspended from the support arm 564A, the RFID tags 552A-1, 552A-2, 552A-3 of the items 550A-1, 550A-2, 550A-3 are provided between within a predefined range of the RFID antenna 562A, thereby ensuring that the RFID tags 552A-1, 552A-2, 552A-3 are tightly coupled with the RFID antenna 562A, and maximizing the probability that RFID signals emitted by such RFID tags 552A-1, 552A-2, 552A-3 upon sensing RF energy emitted by the RFID antenna 562A are properly received by the RFID antenna 562A at a sufficient strength. Moreover, because the RFID tags 552A are provided in an upper portion of the extensions 554A-1, 554A-2, 554A-3, and in close proximity to the RFID antenna 562A, the fact that the items 550A-1, 550A-2, 550A-3 include cheese, which is known to have strongly dielectric properties, does not interfere with either the RFID tags 552A-1, 552A-2, 552A-3 or the RFID antenna 562A, or adversely affect the operation of the system 500A in any way.

Moreover, although each of the items 550A-1, 550A-2, 550A-3 provided on the support bar 564A is homogenous or fungible in nature, e.g., each of the bags of cheese contains an approximately constant mass of food product having a substantially consistent chemical composition, those of ordinary skill in the pertinent arts will recognize that the systems and methods of the present disclosure may be utilized in connection with discrete items that are heterogeneous or not fungible in nature. For example, in some implementations of the present disclosure, item 550A-1 may contain cheese product, while item 550A-2 may contain vegetables and item 550A-3 may contain rice or other grains. The various RFID tags 552A-1, 552A-2, 552A-3 associated with the items 550A-1, 550A-2, 550A-3 may be programmed to transmit discrete RFID signals (e.g., including unique information, data or metadata stored on a microchip or other memory component associated) when the RFID tags 552A-1, 552A-2, 552A-3 are within a predetermined range of the RFID antenna 562A. Thus, even though the items 550A-2, 550A-3 are obscured from view by the item 550A-1, the status of the inventory provided on the support bar 564A may be automatically determined based on the RFID signals emitted by the RFID tags 552A-1, 552A-2, 552A-3 of the items 550A-1, 550A-2, 550A-3 thereon.

As is shown in FIG. 5B, the system 500B includes a plurality of items 550B-1, 550B-2, 550B-3, 550B-4, 550B-5 suspended from a storage unit 560B. The items 550B-1, 550B-2, 550B-3, 550B-4, 550B-5 are neckties, e.g., slender articles of clothing typically formed not only from silk but also from linen, cotton, wool, tweed, cashmere or leather, as well as synthetic fibers. As is shown in FIG. 5B, each of the items 550B-1, 550B-2, 550B-3, 550B-4, 550B-5 includes an RFID tag 552B-1, 552B-2, 552B-3, 552B-4, 552B-5 adhered to a substrate 554B-1, 554B-2, 554B-3, 554B-4, 554B-5, an opening 556B-1, 556B-2, 556B-3, 556B-4, 556B-5 cut into the substrate 554B-1, 554B-2, 554B-3, 554B-4, 554B-5 and a slot 558B-1, 558B-2, 558B-3, 558B-4, 558B-5 passing through the substrate 554B-1, 554B-2, 554B-3, 554B-4, 554B-5. As is also shown in FIG. 5B, the storage unit 560B includes an RFID antenna 562B, a support bar 564B, a shield 566B having a substantially triangular shape and a dielectric buffer 568B provided between the RFID antenna 562B and the shield 566B. As is further shown in FIG. 5B, each of the items 550B-1, 550B-2, 550B-3, 550B-4, 550B-5 is suspended beneath the RFID antenna 562B by the support arm 564B, on which each of the openings 556B-1, 556B-2, 556B-3, 556B-4, 556B-5 provided in the substrates 554B-1, 554B-2, 554B-3, 554B-4, 554B-5 rests.

Thus, as is shown in FIG. 5B, the systems and methods of the present disclosure may be utilized to receive, store and dispense any kind of items of any number and size, which may be suspended by a storage unit in series, and to perform any type of inventory tracking operations regarding the items using RFID systems and technologies. In particular, lengthy and/or slender items, or items that may be formed from materials that require special care and handling, e.g., silk or other fine fabrics, such as the items 550B-1, 550B-2, 550B-3, 550B-4, 550B-5 of FIG. 5B, may be associated with RFID tags and stored in series on a support bar or arm.

As is shown in FIG. 5C, the system 500C includes a plurality of items 550C-1, 550C-2 suspended from a storage unit 560C. The items 550C-1, 550C-2 are packs of batteries, e.g., portable power sources typically including pairs of electrochemical cells which convert stored chemical energy into electrical energy. As is shown in FIG. 5C, the item 550C-1 includes an RFID tag 552C-1 provided in an upper right portion of a container 554C-1, while the item 550C-2 includes an RFID tag 552C-2 provided in an upper left portion of a container 554C-2. Each of the items 550C-1, 550C-2 includes a slot 556C-1, 556C-2 extending through the container 554C-1, 554C-2. As is also shown in FIG. 5C, the storage unit 560C includes an RFID antenna 562C, a support bar 564C, a shield 566C having a shape corresponding to approximately half of a regular octagon and a dielectric buffer 568C provided between the RFID antenna 562C and the shield 566C. As is further shown in FIG. 5C, each of the items 550C-1, 550C-2 is suspended beneath the RFID antenna 562C by the support arm 564C, which extends through each of the slots 556C-1, 556C-2 extending through the containers 554C-1, 554C-2.

Thus, as is shown in FIG. 5C, the systems and methods of the present disclosure may be utilized to receive, store and dispense any kind of items of any number and size, which may be suspended by a storage unit in series, and to perform any type of inventory tracking operations regarding the items using RFID systems and technologies. As is shown in FIG. 5C, when the items 550C-1, 550C-2, 550C-3 are suspended from the support arm 564C, the RFID tags 552C-1, 552C-2, 552C-3 of the items 550C-1, 550C-2, 550C-3 are provided between within a close proximity of the RFID antenna 562C, thereby ensuring that RFID signals emitted by such RFID tags 552C-1, 552C-2, 552C-3 upon sensing RF energy emitted by the RFID antenna 562C may be properly received by the RFID antenna 562C. Moreover, because the RFID tags 552C are provided in an upper portion of the containers 554C-1, 554C-2, 554C-3, and in close proximity to the RFID antenna 562C, the fact that the items 550C-1, 550C-2, 550C-3 include cheese, which is known to have strongly dielectric properties, does not interfere with either the RFID tags 552C-1, 552C-2, 552C-3 or the RFID antenna 562C, or adversely affect the operation of the system 500C in any way.

Thus, as is shown in FIG. 5C, the systems and methods of the present disclosure may be utilized to receive, store and dispense any kind of items of any number and size, which may be suspended by a storage unit in series, and to perform any type of inventory tracking operations regarding the items using RFID systems and technologies. In particular, items containing electrical components, chemical compounds or hazardous materials, such as the items 550C-1, 550C-2, may be associated with RFID tags and stored in series on a support bar or arm. Furthermore, as is also shown in FIG. 5C, RFID tags may be provided in association with items in a randomized manner, e.g., with the RFID tag 552C-1 provided on a left side of the container 554C-1, and the RFID tag 552C-2 provided on an upper left side of the container 554C-2. The randomized arrangement of the RFID tags 552C-1, 552C-2 with respect to an axis of the RFID antenna 562 may minimize the effects of tag shadowing, or where a plurality of RFID tags are provided in close proximity to one another within a predefined range of an RFID antenna and the plurality of RFID tags receive disproportionate amounts of RF energy from the RFID antenna on this basis. By randomly disposing the RFID tags 552C-1, 552C-2 on the containers 554C-1, 554C-2 in locations within the electromagnetic fields emitted by the RFID antenna 562, the probability that RFID signals will be received from each of the RFID tags 552C-1, 552C-2 is enhanced, and tag shadowing may be avoided.

Those of ordinary skill in the pertinent arts will recognize that the systems and methods of the present disclosure may rely on any structural relationship or orientation which causes RFID tags to be presented within an electromagnetic field emitted by an RFID antenna provided in association with a support bar or like element for suspending one or more items therefrom. For example, in addition to the RFID tags 552A-1, 552A-2, 552A-3 adhered to extensions 554A-1, 554A-2, 554A-3 of the bags of cheese shown in FIG. 5A, the RFID tags 552B-1, 552B-2, 552B-3, 552B-4, 552B-5 adhered to substrate 554B-1, 554B-2, 554B-3, 554B-4, 554B-5 associated with the neckties shown in FIG. 5B, or the RFID tags 552C-1, 552C-2 provided in upper portions of containers 554C-1, 554C-2 of batteries shown in FIG. 5C, RFID tags may be provided, for example, within or in association with a hook of a coat hanger, or stitched into or adhered to a loop of a shirt or coat. A bar for suspending the coat hanger, or a peg or hook for hanging the shirt or coat, may include an RFID antenna that is intended to remain within a predefined range of such RFID tags when the coat hanger is suspended from the bar, or when the shirt or coat is hanging from the peg or hook, respectively. The number or type of applications in which the systems and methods of the present disclosure may be utilized are not limited to systems utilized or methods performed in materials handling facilities, or to any of the implementations disclosed herein.

As is discussed above, some of the storage units of the present disclosure may include pegs or other extensions that enable the storage units to be stored in a pegboard or other perforated panel having a plurality of holes arranged in a pattern that is provided within an inventory area of a materials handling facility. Referring to FIGS. 6A and 6B, views of components of one system 600 for inventory tracking using RFID in accordance with implementations of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A through 5C, by the number "4" shown in FIGS. 4A through 4C, by the number "3" shown in FIGS. 3A through 3C, by the number "2" shown in FIGS. 2A through 2D, or by the number "1" shown in FIGS. 1A through 1D.

As is shown in FIGS. 6A and 6B, the system 600 includes an inventory area 640 and a storage unit 660. The inventory area 640 comprises a pegboard having a plurality of holes 642 provided in an array or pattern. The storage unit 660 includes an RFID antenna 662 and a support bar 664 mounted to a base 665, with a plurality of pegs 666A, 666B or other extensions extending from the base 665. The RFID antenna 662 may be associated with any RFID reading systems or components that may reside on the storage unit 660 or may be external to the storage unit 660, including but not limited to one or more such systems or components that are provided elsewhere within the inventory area 640 (not shown), and in communication with the RFID antenna 662, e.g., by wired or wireless means.

As is also shown in FIGS. 6A and 6B, the pegs 666A, 666B are separated by a predefined distance and aligned on the base 665 in a manner that is consistent with the array or pattern of the plurality of holes 642. In order to install the storage unit 660 in the inventory area 640, the pegs 666A, 666B may be extended into any selected pair of the holes 642A, 642B and the storage unit 660 rotated downward until the base 665 is pressed against the pegboard of the inventory area 640. Although the pegs 666A, 666B and the plurality of holes 642 are shown as being aligned substantially horizontally on the base 665 and the pegboard, respectively, the pegs 666A, 666B and the holes 642 may be provided in any alignment or configuration (e.g., in non-horizontal alignments, or with two or more groups of pegs provided in different horizontal planes), such that the predefined distance separating the pegs 666A, 666B and the holes 642 enable items to be suspended vertically from the support bar 664 when the storage unit is installed at the inventory area 640.

Likewise, as is also discussed above, the storage units of the present disclosure may further include one or more features that enable an RFID antenna to receive electrical power and/or RF energy from an external source, and to identify a specific location within an inventory area where the storage units are installed. Referring to FIGS. 7A through 7D, views of components of one system 700 for inventory tracking using RFID in accordance with implementations of the present disclosure are shown. Except where otherwise noted, reference numerals preceded by the number "7" shown in FIGS. 7A through 7D indicate components or features that are similar to components or features having reference numerals preceded by the number "6" shown in FIGS. 6A and 6B, by the number "5" shown in FIGS. 5A through 5C, by the number "4" shown in FIGS. 4A through 4C, by the number "3" shown in FIGS. 3A through 3C, by the number "2" shown in FIGS. 2A through 2D, or by the number "1" shown in FIGS. 1A through 1D.

Figure 7A:
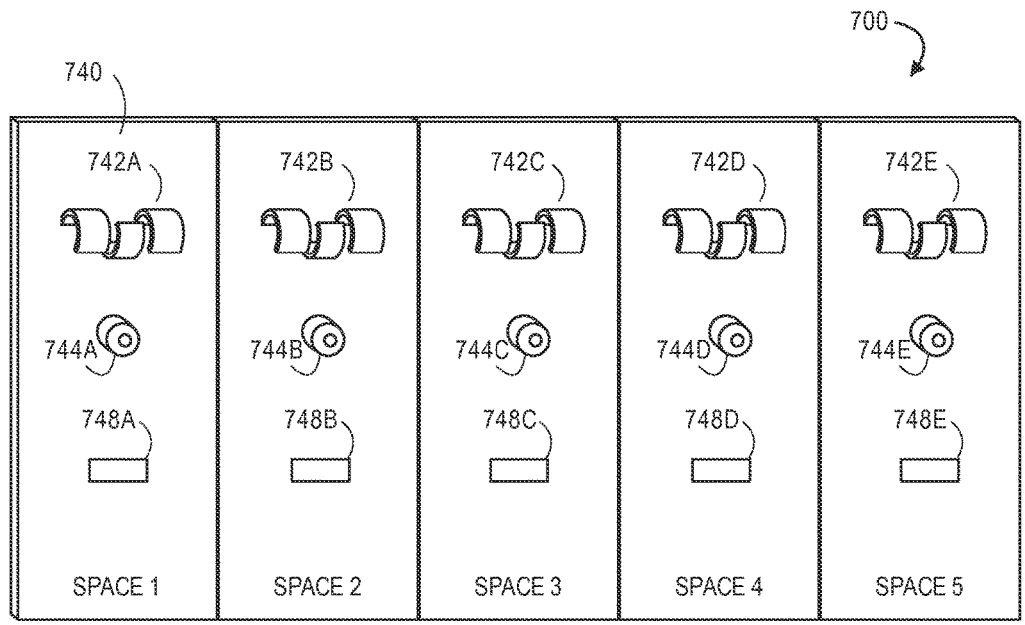
FIGS. 7A through 7D are views of components of one system for inventory tracking using RFID in accordance with implementations of the present disclosure.
Figure 7B:
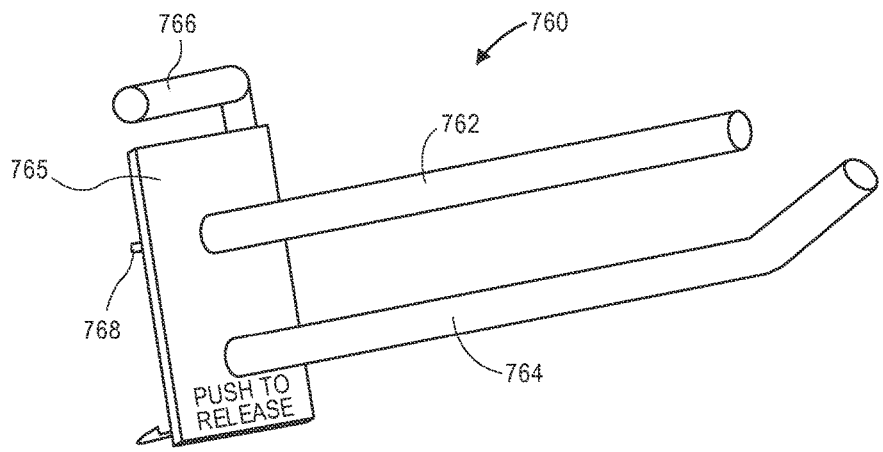

As is shown in FIGS. 7A and 7B, the system 700 includes an inventory area 740 and a storage unit 760. As is shown in FIG. 7A, the inventory area 740 comprises a panel having a plurality of knuckles 742A, 742B, 742C, 742D, 742E (e.g., sheaths or sheathed connectors), a plurality of ports 744A, 744B, 744C, 744D, 744E and a plurality of slots 746A, 746B, 746C, 746D, 746E provided in discrete spaces within the inventory area 740. Each of the knuckles 742A, 742B, 742C, 742D, 742E is aligned substantially horizontally and includes a plurality of extensions that define openings for receiving a cylindrical extension (e.g., a barrel pin) therein. The ports 744A, 744B, 744C, 744D, 744E may be linked to a power source for enabling a RFID antenna 762 provided on the storage unit 760 to emit RF energy, e.g., one or more electromagnetic fields. For example, the ports 744A, 744B, 744C, 744D, 744E may be coaxial ports for providing RF energy directly to the RFID antenna 762 via one or more conductors. Alternatively, the ports 744A, 744B, 744C, 744D, 744E may be associated with an electrical power source, e.g., an alternating current ("AC") or direct current ("DC") power source, which may provide electrical power to an RF energy source (not shown) provided in association with the storage unit 760, which may generate RF energy to be emitted by the RFID antenna 762. Each of the slots 746A, 746B, 746C, 746D, 746E is aligned to receive a hook or other locking feature provided on a storage unit installed within one of the discrete spaces.

As is shown in FIG. 7B, the storage unit 760 includes an RFID antenna 762, a support bar 764, a bolt 766, a hook 767 and an RF connector 768 that are mounted to a base 765. The RFID antenna 762 and the support bar 764 are joined to a front face of the base at proximal ends and extend in parallel therefrom. A free, distal end of the support bar 764 is bent or canted upward beyond a free, distal end of the RFID antenna 762. The bolt 766 is mounted above the base 765, perpendicular to the RFID antenna 762 and the support bar 764. The bolt 766 is sized to correspond to dimensions (e.g., a length and diameter) of the knuckles 742A, 742B, 742C, 742D, 742E. The hook 767 is provided at a predefined distance from an axis defined by the bolt 766 that is equal to a distance between an axis defined by the knuckles 742A, 742B, 742C, 742D, 742E and the slots 746A, 746B, 746C, 746D, 746E, and is also sized to correspond to dimensions of the slots 746A, 746B, 746C, 746D, 746E. Thus, a worker may quickly and efficiently install the storage unit 760 in the inventory area 740 by inserting the bolt 766 into one of the knuckles 742A, 742B, 742C, 742D, 742E and allowing the storage unit 760 to rotate downward and into contact with the inventory area 740, with the hook 767 releasably extending into a corresponding one of the slots 746A, 746B, 746C, 746D, 746E.

Figure 7C:
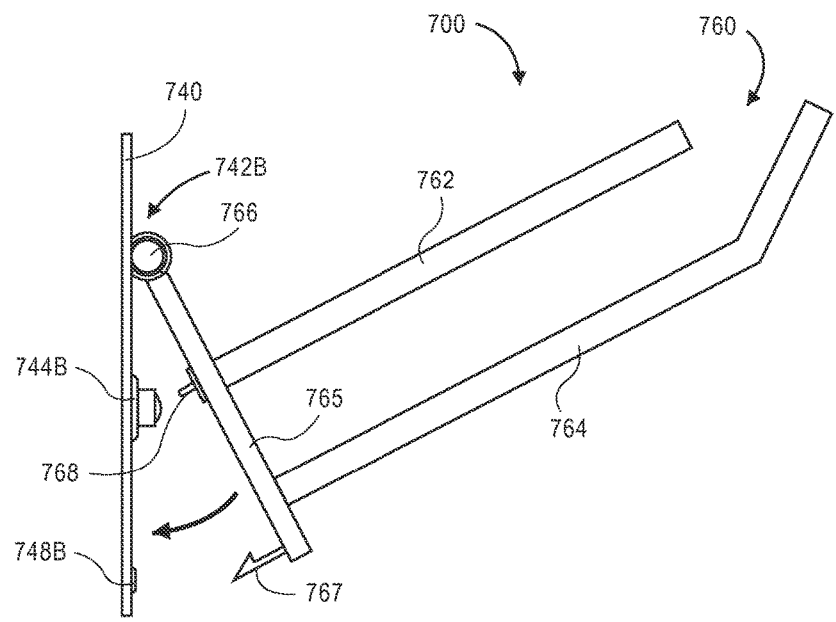

The RF connector 768 may be a coaxial extension from a rear face of the base 765 and is electrically coupled to the RFID antenna 762. The RF connector 768 is provided at a predefined distance from the axis defined by the bolt 766 that is equal to a distance between the axis defined by the knuckles 742A, 742B, 742C, 742D, 742E and the ports 744A, 744B, 744C, 744D, 744E. As is shown in FIG. 7C, when the bolt 766 is inserted into one of the knuckles 742A, 742B, 742C, 742D, 742E, the storage unit 760 may rotate downward such that the RF connector 768 comes into contact with a corresponding one of the ports 744A, 744B, 744C, 744D, 744E. The support bar 764 may be thereby installed in a cantilevered manner, and one or more items bearing RFID tags may be suspended from the support bar 764 accordingly.

In some implementations, the ports 744A, 744B, 744C, 744D, 744E may define a coaxial connection with the RF connector 768, thereby enabling RF energy to be provided to the RFID antenna 762 from an external source. For example, in one implementation, each of the ports 744A, 744B, 744C, 744D, 744E may comprise a biasing element, such as a compression spring, and may quickly and effectively make a connection with the RF connector 768 when the storage unit 760 is pressed into contact with the inventory area 740. Once the bolt 766 is inserted into one of the knuckles 742A, 742B, 742C, 742D, 742E and the storage unit 760 is rotated downward and toward the inventory area 740, the RF connector 768 may be received into one of the ports 744A, 744B, 744C, 744D, 744E. In some other implementations, the RF connector 768 may further include a biasing element, such as a compression spring. Alternatively, in other implementations (not shown), the inventory area 740 may include a plurality of pin-like elements, such as the RF connector 768, and the storage unit 740 may include a substantially cylindrical port, such as one of the ports 744A, 744B, 744C, 744D, 744E, and a coaxial connection may be formed when the pin-like element of one of the spaces of the inventory area 740 is received into the port of the storage unit 760.

Storage units that may be quickly and effectively installed in inventory areas, such as the storage units 660, 760 and inventory areas 640, 740 of FIGS. 6A and 6B or FIGS. 7A through 7D, thereby forming connections between RF energy sources and RFID antennas, facilitate cleaning, maintenance and other collateral functions to be performed equally quickly and effectively. For example, where an inventory area includes compressible ports having flexible extensions, such as the inventory area 740 and the ports 744A, 744B, 744C, 744D, 744E of FIGS. 7A through 7D, the inventory area 740 may be easily cleaned, maintained or prepared when each of the storage units 760 has been removed therefrom, e.g., using a soft cloth, sponge, towel or other common cleaning device, or one or more tools or other apparatuses.

Figure 7D:
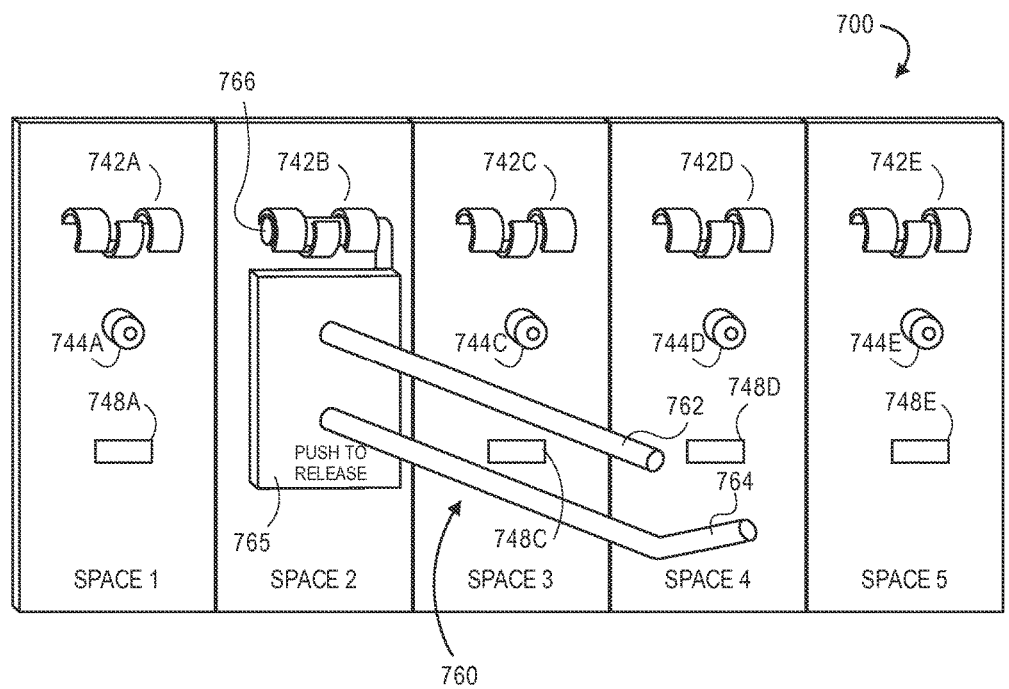

Likewise, the connection may be quickly and effectively opened once the storage unit 760 is rotated upward and away from the inventory area 740. As is shown in FIG. 7D, the bolt 766 of the storage unit 760 is inserted into the knuckle 742B, and the storage unit 760 is rotated down such that the RF connector 768 contacts the port 744B. That the storage unit 760 is installed at a specific one of the spaces, viz., Space 2, as is shown in FIG. 7D, may be determined when the RF connector 768 is pressed into contact with one of the ports 744A, 744B, 744C, 744D, 744E. When the storage unit 760 is to be removed from the inventory area 740, a worker may release the hook from the slot 746B, rotate the storage unit 760 upward, and slide the bolt 766 out of the knuckle 742B.

Figure 8:
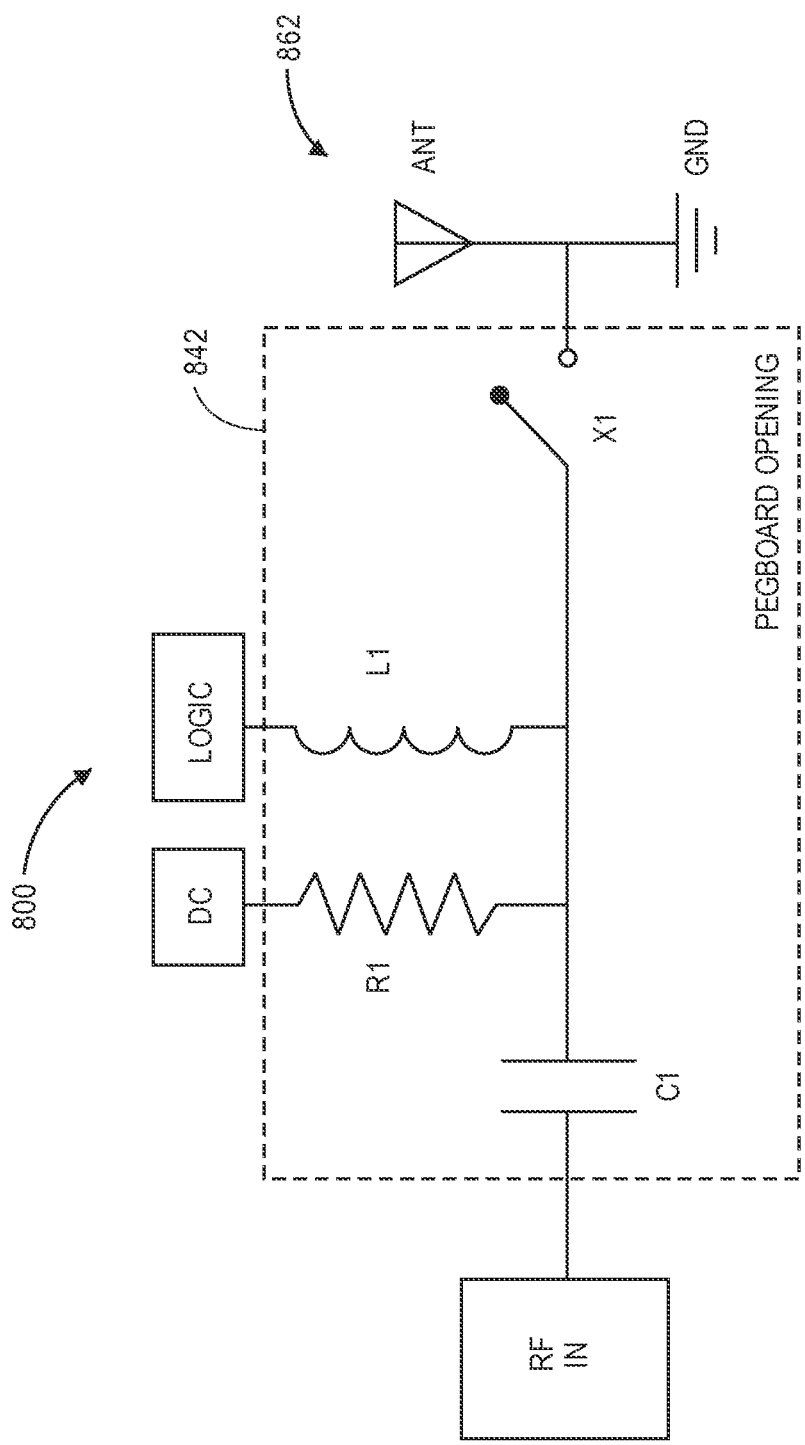
FIG. 8 is a view of components of one circuit for inventory tracking using RFID in accordance with implementations of the present disclosure.

The systems and methods of the present disclosure may also include one or more circuits having components configured to determine whether a storage unit is installed at an inventory area, e.g., in a pegboard associated with the inventory area, and to also determine a location at the inventory area where the storage unit is installed. For example, each of a plurality of locations where a storage unit may be installed (e.g., each of the openings of a pegboard) may include components that may detect when the storage unit is installed therein, and when the storage unit is removed therefrom. After an item is determined to be suspended from a storage unit provided at a given location within an inventory area, e.g., based on RFID signals transmitted from an RFID tag provided on an item to an RFID antenna associated with the storage unit, the location of the storage unit within the inventory area may also be associated with the item, e.g., in a record of inventory that lists or includes the item. Referring to FIG. 8, a circuit 800 is shown. The circuit 800 includes an RF energy input, a DC power source and a load detection logic circuit. The circuit 800 further includes a capacitor C1, a resistor R1 and an antenna connector X1 associated with a pegboard opening 842. The capacitor C1 is aligned to filter the RF energy source from DC voltage from the DC power source. The inductor L1 acts as a closed circuit to the DC voltage from the DC power source, and as an open circuit to the RF energy from the RF energy source. The antenna connector X1 determines when an antenna 862 associated with a storage unit is inserted into the pegboard opening 842.

In accordance with the present disclosure, a circuit, such as the circuit 800, may quickly and effectively determine that a storage unit having an RFID antenna has been inserted into a pegboard or installed at another structural feature, and also that the storage unit has been removed or uninstalled therefrom. For example, where a pegboard includes a matrix or array of openings, each of the openings may be provided with circuit components, such as the capacitor C1, the resistor R1, the inductor L1 and the antenna connector X1 shown in associated with the pegboard opening 842 of the circuit 800 of FIG. 8, to indicate whether the opening includes a storage unit received therein, or whether the opening is vacant.

The circuit 800 of FIG. 8 is configured to provide a first digital signal to the load detection logic indicating when an antenna is inserted into an opening or installed in a predetermined location, and a second digital signal to the load detection logic indicating when the antenna is not inserted therein. In some implementations, the DC power source may have a nominal DC voltage level, and the level of resistance provided by the resistor R1 may be substantially larger than a level of internal resistance of an antenna. Inserting an RFID antenna into an opening closes the antenna connector X1, and causes a first voltage drop corresponding to the vast majority of the DC voltage from the DC power source to be observed across the resistor R1, and a second voltage drop, e.g., of near-zero value, to be observed by the load detection logic in association with the RFID antenna. Removing the RFID antenna from the opening opens the antenna connector X1 and causes the load detection logic to sense the DC voltage from the DC power source in its entirety. For example, in some implementations, the DC power source may have a DC voltage of approximately five volts (or 5V), the value of the resistor R1 may be approximately ten kiloohms (10 kΩ), and the internal resistance of the antenna may be approximately fifty ohms (50Ω). Thus, based on the placement of the inductor L1 and the load detection logic in the circuit 800, the voltage sensed by the load detection logic when an antenna is inserted into an opening is the voltage drop associated with the antenna, or approximately twenty-five millivolts (25 mV), or approximately zero. Removing the RFID antenna from the opening opens the antenna connector X1, and the voltage sensed by the load detection logic is approximately five volts (5V).

In some implementations, a plurality of circuits, such as the circuit 800, may be provided in association with each of the holes or other openings of a pegboard, a panel, a wall, a gondola rack, a shelf or another fixture or structural element. A central processor or other component associated with the circuit 800 may track the voltage levels associated with each of the openings and determine whether such openings include storage units having RFID antennas inserted therein. Additionally, whether a hole or other opening includes a storage unit having an RFID antenna may be determined by any number of other systems or methods. For example, referring again to the system 700 of FIGS. 7A through 7D, a specific slot may be identified as having a storage unit 760 inserted therein when the RF connector 768 comes into contact with one of the ports 744A, 744B, 744C, 744D, 744E, thereby causing RF energy to be provided to the RFID antenna 762 by way of the RF connector 768.

Figure 9A:
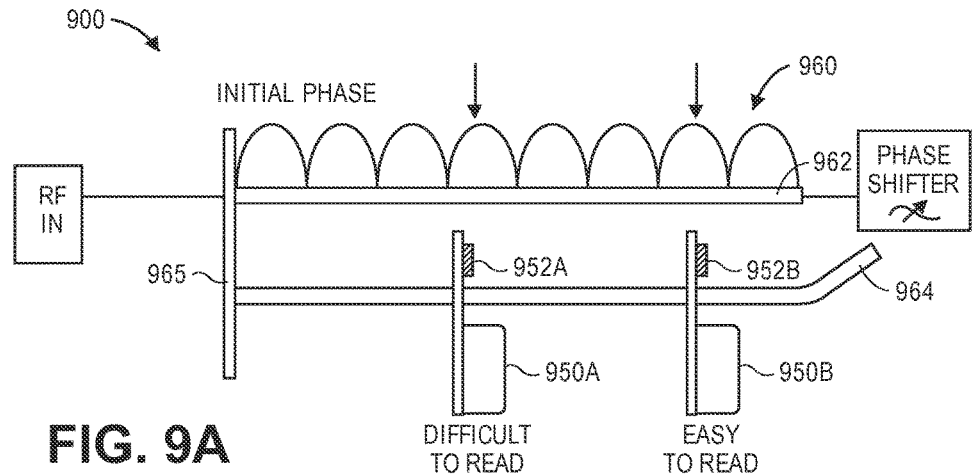
FIGS. 9A through 9C are views of components of one system for inventory tracking using RFID in accordance with implementations of the present disclosure.
Figure 9B:
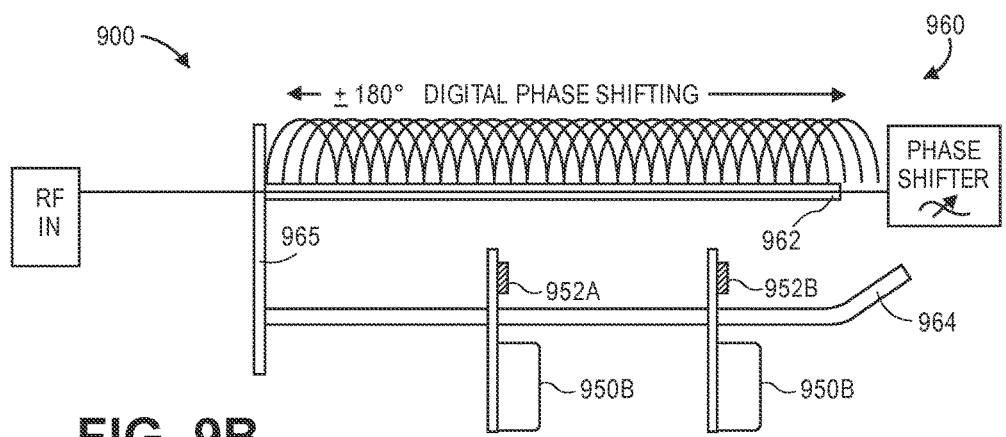
Figure 9C:
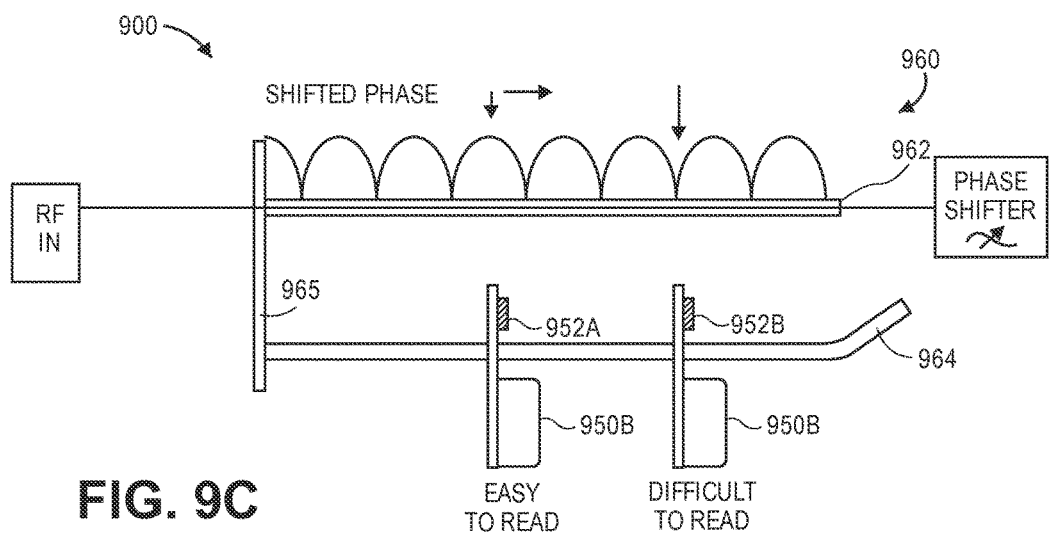

As is also discussed above, the systems and methods of the present disclosure may further include one or more features or components for changing the phase of an electromagnetic field emitted by an RFID antenna, thereby increasing a likelihood that each of the items suspended from a support bar will be recognized based on RFID signals emitted by RFID tags associated therewith, regardless of the shape of any one standing wave of the electromagnetic field. Referring to FIGS. 9A through 9C, views of components of one system 900 for inventory tracking using RFID in accordance with implementations of the present disclosure are shown. Except where otherwise noted, reference numerals preceded by the number "9" shown in FIGS. 9A through 9C indicate components or features that are similar to components or features having reference numerals preceded by the number "7" shown in FIGS. 7A through 7D, by the number "6" shown in FIGS. 6A and 6B, by the number "5" shown in FIGS. 5A through 5C, by the number "4" shown in FIGS. 4A through 4C, by the number "3" shown in FIGS. 3A through 3C, by the number "2" shown in FIGS. 2A through 2D, or by the number "1" shown in FIGS. 1A through 1D.

As is shown in FIG. 9A, the system 900 includes a pair of items 950A, 950B provided on a storage unit 960 including an RFID antenna 962 and a support bar 964 mounted to a base 965. Each of the items 950A, 950B includes an RFID tag 952A, 952B and rests on the support bar 964 at a discrete location. The RFID antenna 962 is electronically coupled with an RF energy source for emitting an electromagnetic field having a standing wave pattern (e.g., a rectified standing wave pattern) in an initial phase shown in FIG. 9A. The RFID antenna 962 further includes a phase shifter having one or more resistors or an adjustable resistance provided at a distal end of the RFID antenna 962 such that varying the resistance using the phase shifter adjusts the impedance of the RFID antenna 962 and, therefore, shifts the phase of rectified standing wave pattern emitted thereby. Alternatively, the phase shifter may incorporate one or more inductors or capacitors, or an adjustable inductance or capacitance, for causing the impedance of the RFID antenna 962 to change. The phase shifter may operate to vary the impedance of the RFID antenna 962 in any manner or mode, e.g., electronically, magnetically or mechanically. For example, the phase shifter may be an analog phase shifter that is configured to shift a phase according to a predetermined voltage level, or a digital phase shifter that may be controlled using one or more computer processors. The phase shifter may operate actively or passively to shift a phase of standing wave patterns of one or more electromagnetic fields emitted by the RFID antenna 962 by a predetermined angular extent.

As is shown in FIG. 9A, a position of the item 950A on the support bar 964 corresponds to a point at which the strengths of the electromagnetic fields emitted by the RFID antenna 962 via the RF energy source are at relative valleys or minima. Thus, because the strength of the RFID signal emitted by the RFID tag 952A is a function of the strength of the electromagnetic field in which the RFID tag 952A is located, the RFID signal emitted by the RFID tag 952A will be weak when the standing wave pattern of the electromagnetic field is in the initial phase shown in FIG. 9A, and determining that the item 950A is suspended from the support bar 964 at the location shown in FIG. 9A is comparatively difficult.

Conversely, as is also shown in FIG. 9A, a position of the item 950B on the support bar 964 corresponds to a point at which the electromagnetic fields emitted by the RFID antenna 962 via the RF energy source are at relative peaks or maxima. Therefore, because the strength of the RFID signal emitted by the RFID tag 952B is a function of the strength of the electromagnetic field in which the RFID tag 952B is located, the RFID signal emitted by the RFID tag 952B will be strong when the standing wave pattern of the electromagnetic field is in the initial phase shown in FIG. 9A, and determining that the item 950B is suspended from the support bar 964 at the location shown in FIG. 9A is comparatively easy.

In accordance with the present disclosure, a phase of a standing wave pattern of an electromagnetic field may be shifted by intentionally instituting an impedance mismatch between RF energy and an RFID antenna within a transmission line, e.g., by changing a level of impedance at a terminus of the RFID antenna. The impedance mismatch causes the electromagnetic field to vary in phase with respect to locations of an RFID antenna, or a corresponding support bar, thereby virtually changing the relative strength of the electromagnetic field sensed by RFID tags borne by items suspended from the support bar. Referring to FIG. 9B, the system 900 includes a phase shifter provided in series between the RF energy source and the RFID antenna 962. A mismatch within the transmission line may be instituted by a phase shifting component that changes the resistance and, therefore, the impedance, of the RFID antenna 962, thereby digitally extending or retracting the standing wave patterns of the electromagnetic fields, as is shown in FIG. 9B. Once the mismatch is instituted by a change in impedance of the RFID antenna 962, a phase of a standing wave pattern of the electromagnetic field along the RFID antenna 962 may be shifted by a predetermined angular extent, typically not more than one hundred eighty degrees, or not more than ninety degrees, in either direction with respect to the length of the support bar 964.

The use of a phase shifting apparatus to translate a standing wave pattern in either direction with respect to the support bar provides a number of advantages. For example, where the RFID antenna is relatively short, shifting the phase of the standing wave pattern of the electromagnetic field emitted by the RFID antenna enables a location of an item bearing an RFID tag within the electromagnetic field to be identified with respect to the support bar on which the item rests based at least in part on a strength of the RFID signal received by the RFID tag. Where the RFID antenna is relatively long, however, shifting the phase of the standing wave pattern of the electromagnetic field increases the likelihood that items bearing RFID tags resting on the support bar along the entire length of the RFID antenna will be identified, for the relative strength of the electromagnetic field at each of the locations will be sufficiently strong for at least a finite period of time, thereby enabling each of the RFID tags borne by items suspended therefrom to emit sufficiently strong RFID signals to an RFID antenna.

Referring to FIG. 9C, the system 900 of FIG. 9A is shown with a shift introduced in the phase of the standing wave pattern of the electromagnetic field. As is shown in FIG. 9C, the shift in the phase of the standing wave pattern, as compared to the phase of the standing wave pattern of FIG. 9A, causes the item 950A to be located within one of the plurality of relative peaks or maxima in the strength of the electromagnetic field. Therefore, the RFID signal emitted by the RFID tag 952A will be strong when the standing wave pattern of the electromagnetic field is in the shifted phase of FIG. 9C, and determining that the item 950A is located on the support bar 964 at the location shown in FIG. 9C will be comparatively easy. Conversely, as is also shown in FIG. 9C, the shift in the phase of the standing wave pattern of the electromagnetic field causes the item 950B to be located within one of the plurality of relative valleys or minima in the strength of the electromagnetic field. Therefore, the RFID signal emitted by the RFID tag will be relatively weak when the electromagnetic field is in the shifted phase, and determining that the item 950B is located on the support bar 964 at the location shown in FIG. 9C will be comparatively difficult.

Thus, the shifting of phases of electromagnetic fields emitted by an RFID antenna in a horizontal direction, e.g., along a length of the RFID antenna, at regular intervals ensures that a sufficiently high magnitude of the electromagnetic field will be present at each location along a support bar for at least a minimum period of time, enabling items bearing RFID tags that are suspended from the support bar, at any location, to transmit a sufficiently strong RFID signal to the RFID antenna. Shifting the phases thus complements the geometric relationship of a storage unit with regard to the vertical separation between the support bar and the RFID antenna in increasing the probability that RFID signals transmitted by RFID tags provided on items suspended from the support bar will be received at a sufficient strength by the RFID antenna.

Figure 10:
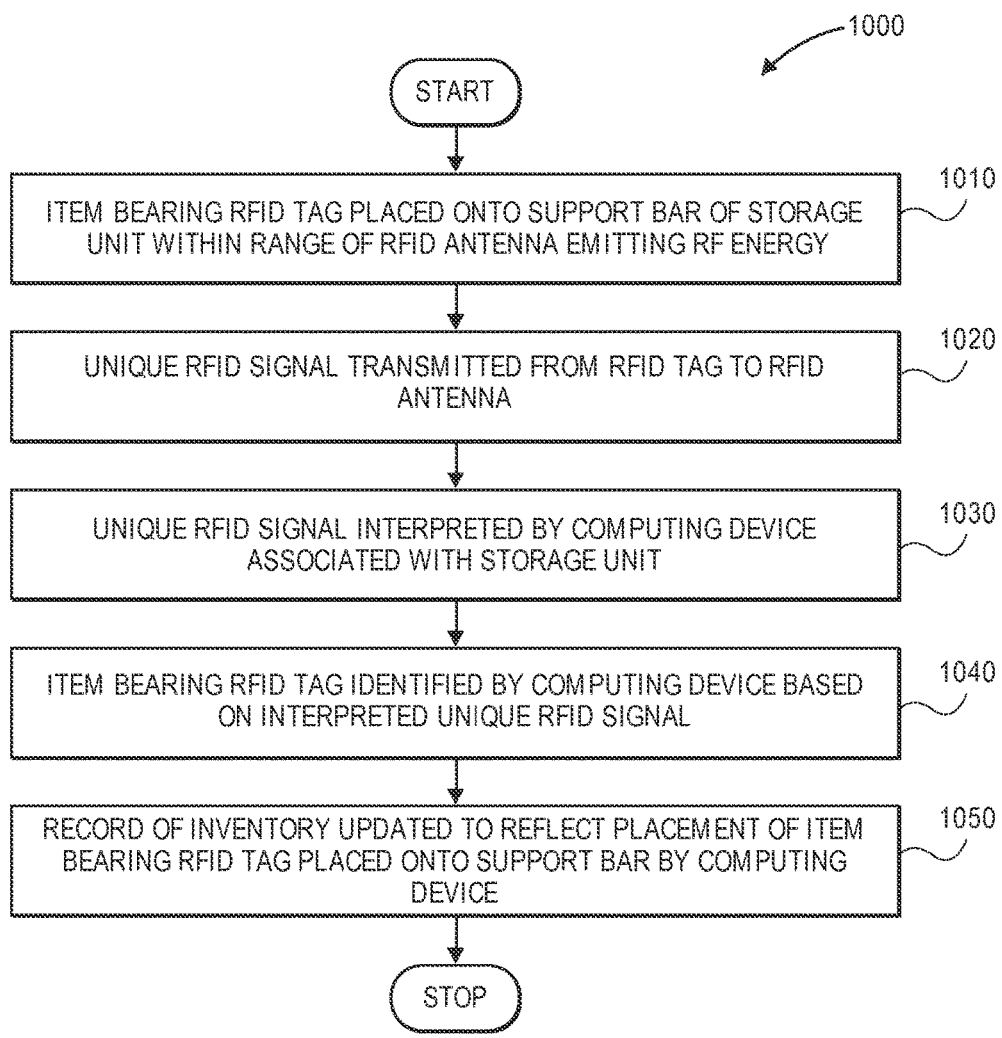
FIG. 10 is a view of a flow chart of one process for inventory tracking using RFID in accordance with implementations of the present disclosure.

In some implementations, the systems and methods of the present disclosure may be utilized to record the addition of one or more items to inventory when such items are placed onto a support bar or arm, or another like feature provided within a predetermined range of an RFID antenna. Referring to FIG. 10, a flow chart 1000 of one process for inventory tracking using RFID in accordance with implementations of the present disclosure is shown. At box 1010, an item bearing an RFID tag is placed onto a support bar of a storage unit within a predefined range of an RFID antenna. For example, referring again to FIG. 1C, the free end of the support arm 164 may be extended through the slot 156 of the hanging tab 154, thereby enabling the support arm 164 to support the weight of the item 150 as the slot 156 rests on the hanging tab 154. The hanging tab 154 may be bent or folded, as necessary, to allow the hanging tab 154 to pass beneath the placard 145.

At box 1020, a unique RFID signal is transmitted to the RFID antenna by the RFID tag provided on the item. For example, referring again to FIG. 1D, the RFID tag 152 on the item 150 may transmit an RFID signal including information, data or metadata stored thereon in a microchip or other memory component when the RFID tag 152 senses an electromagnetic field emitted by the RFID antenna 162. At box 1030, the unique RFID signal transmitted by the RFID tag provided on the item is interpreted by a computing device associated with the storage unit, and at box 1040, the item bearing the RFID tag is identified by the computing device based on the interpreted unique RFID signal. The computing device may be provided within a vicinity of the RFID antenna, or in an alternate or virtual location, e.g., in a "cloud"-based environment, and may, for example, identify the item based on the information, data or metadata included in the RFID signal using a look-up table or other record or file maintained in a data store.

At box 1050, a record of inventory is updated to reflect the placement of the item bearing the RFID tag onto the support bar by the computing device, and the process ends. For example, the computing device may add an identifier of the item to a data file or record of the inventory on the storage unit, or the aggregate inventory in an inventory area or a materials handling facility in which the storage unit is provided. Alternatively, where one or more of the item is already present in the inventory, a variable or indicator of a quantity of the item in the inventory may be increased by one to reflect the placement of the item onto the support bar at box 1010. Moreover, the inventory may be further updated to include information identifying a discrete location of the storage unit on which the item bearing the RFID tag has been placed. For example, the location of the storage unit may be determined based on a location of an RFID connector or port associated with the storage unit, such as is described above with regard to the system 700 of FIGS. 7A through 7D, using one or more electrical circuits having components associated with openings or locations within an inventory area, such as is described above with regard to the circuit 800 of FIG. 8, or in any other manner.

Figure 11:
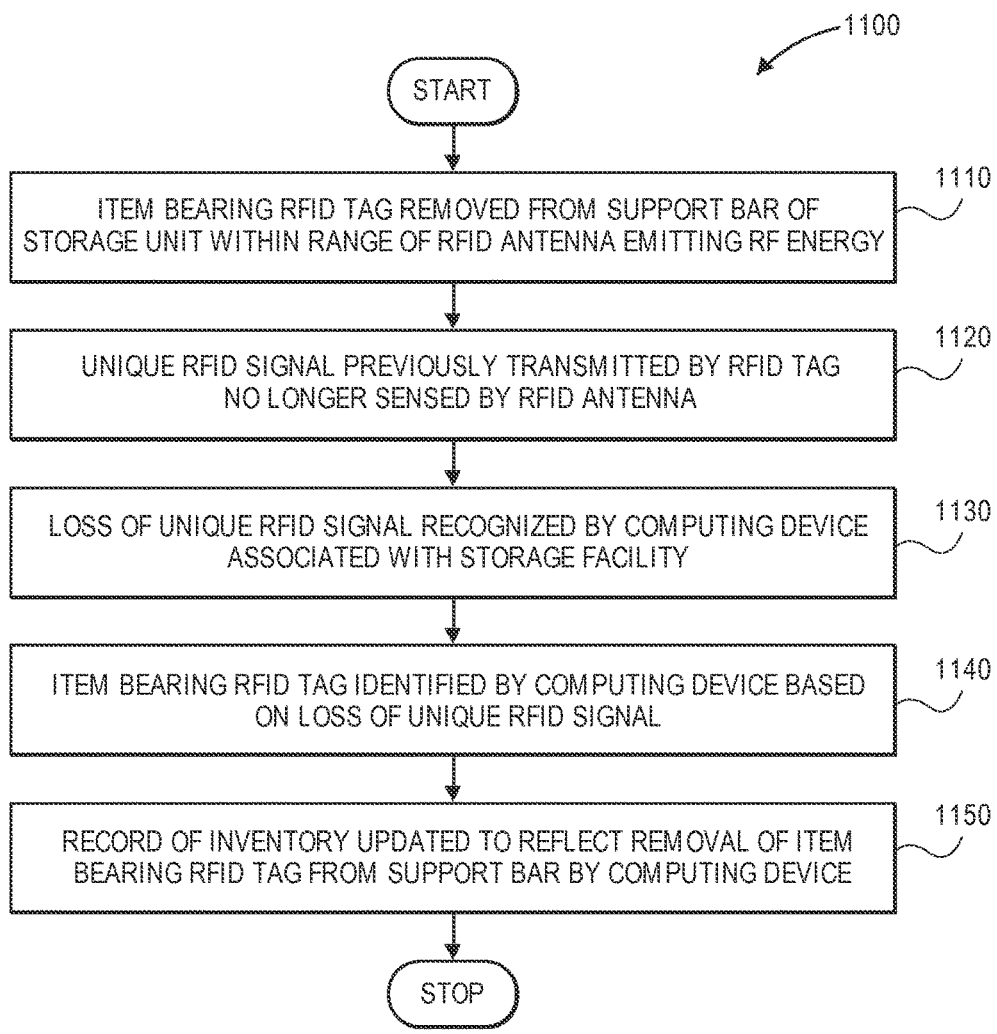
FIG. 11 is a view of one flow chart of one process for inventory tracking using RFID in accordance with implementations of the present disclosure.

In some other implementations, the systems and methods of the present disclosure may be utilized to record the removal of one or more items from inventory when such items are removed from a support bar or arm, or another like feature provided within a predetermined range of an RFID antenna. Referring to FIG. 11, a flow chart 1100 of one process for inventory tracking using RFID in accordance with implementations of the present disclosure is shown. At box 1110, an item bearing an RFID tag is removed from a support bar of a storage unit provided within a predefined range of an RFID antenna. At box 1120, a unique RFID signal that was previously transmitted from the RFID tag borne by the item to the RFID antenna is no longer sensed by the RFID antenna. For example, referring again to FIG. 1D, when the hanging tag 154 of the item 150 is slid off of the support bar 164 of the storage unit 160, an RFID signal that was transmitted when the RFID tag 152 was within the predefined range of the RFID antenna 162 will no longer be transmitted when the RFID tag 152 departs from the predefined range of the RFID antenna 162.

At box 1130, the loss of the unique RFID signal is recognized by a computing device associated with the storage unit. For example, a computing device may be configured to maintain a record of each of the RFID signals received by the RFID antenna, including relevant information, data or metadata such as the contents of such signals, times or dates at which such signals were received for the first time, or most recently received, levels of intensity of each of the signals, as well as confidence intervals or other metrics indicative of levels of confidence that the interpreted RFID signals are accurate. When one of the RFID signals is lost, the record may be updated to reflect that the RFID signal is no longer sensed. At box 1140, an item bearing the RFID tag is identified based on the loss of the unique RFID signal. For example, upon recognizing that one of the unique RFID signals previously received by an RFID antenna is no longer sensed, an RFID tag that transmitted the unique RFID signal may be identified, and an item bearing the RFID tag may also be likewise identified. At box 1150, a record of inventory may be updated to reflect that the item bearing the RFID tag has been removed from the support bar and is no longer available, and the process ends. For example, a variable or indicator of a quantity of the item in a data file or record of the inventory on the storage unit, or the aggregate inventory in an inventory area or a materials handling facility in which the storage unit is provided may be decremented by one to reflect the removal of the item from the support bar at box 1110. Alternatively, a line item or entry corresponding to the item in the inventory may be removed from the data file or record if the item bearing the RFID tag was the last of such items remaining on the storage unit, or in an inventory area or materials handling facility in which the storage unit is provided.

Figure 12:
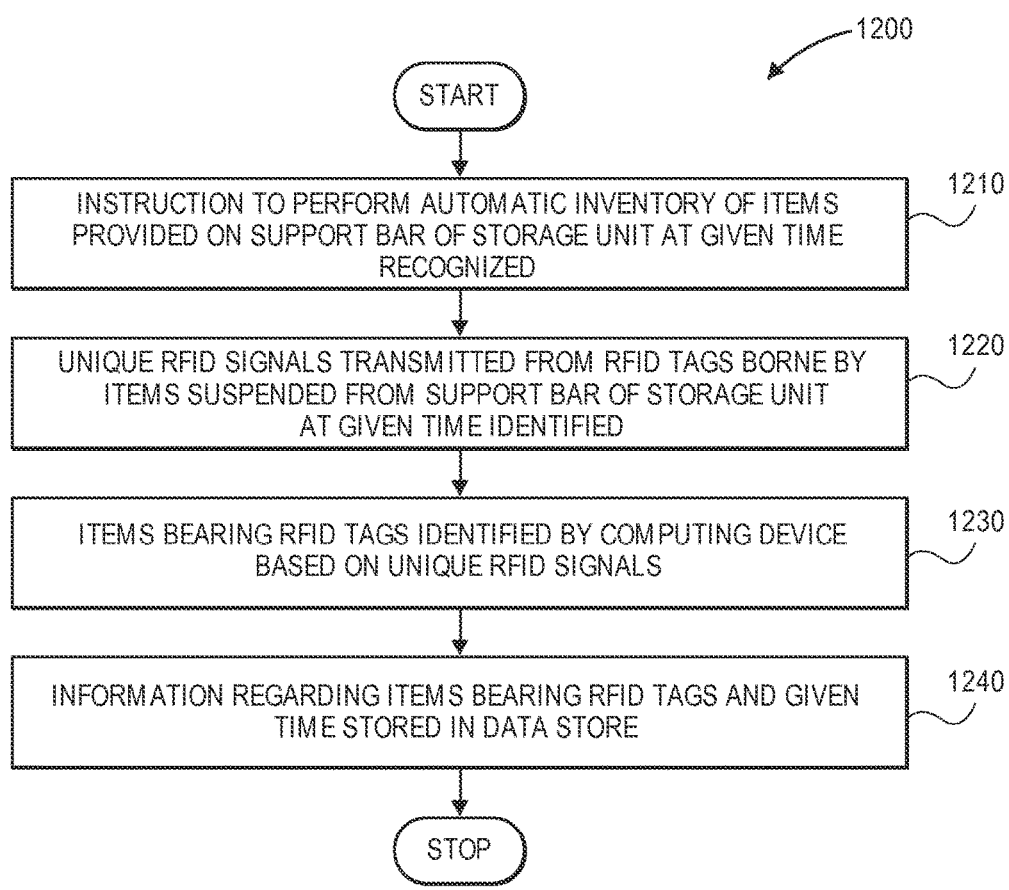
FIG. 12 is a view of one flow chart of one process for inventory tracking using RFID in accordance with implementations of the present disclosure.

In some other implementations, the systems and methods of the present disclosure may be utilized to conduct an accounting of the available inventory at a storage unit, e.g., a storage unit having a support bar or arm with items bearing RFID tags suspended therefrom within a vicinity of an RFID antenna emitting RF energy, at a given time or in accordance with a predetermined schedule. Referring to FIG. 12, a flow chart 1200 of one process for inventory tracking using RFID in accordance with implementations of the present disclosure is shown. At box 1210, an instruction to perform an automatic inventory of the items provided on a support bar of a storage unit at a given time is recognized. For example, the automatic inventory may be scheduled or initiated manually, e.g., through user contact or interaction with one or more user interfaces provided in a software application or a touch of a dedicated button or switch, or automatically in accordance with a predetermined schedule or upon the occurrence of a specific event.

At box 1220, one or more unique RFID signals being transmitted by RFID tags borne by items suspended from the support bar of the storage unit at the given time are identified. For example, where a plurality of RFID signals are received at a given time by an RFID antenna provided within a predefined range, each of the unique RFID signals may be identified based on the information, data or metadata included therein. The RFID signals may be identified at a fixed point in time, or over a predefined interval of time, and information regarding such signals (e.g., the information, data or metadata contained therein) may be stored in a data file or record.

At box 1230, the items bearing the RFID tags from which the unique RFID signals were transmitted are identified. For example, each of the RFID signals identified at box 1220 may be correlated to one of a plurality of items based on the contents of such signals or any other factors. At box 1240, information regarding the items bearing the RFID tags identified at box 1230 and the given time are stored in a data store, and the process ends. The information may include a detailed summary of the specific items identified as stored at a storage unit at the given time (e.g., specific contents and/or attributes of each of the items suspended from the support arms 564A, 564B, 564C shown in FIGS. 5A through 5C), or a general summary of a number of one or more types or groups of items (e.g., a number of the bags of cheese, ties or packs of batteries suspended from the support arms 564A, 564B, 564C shown in FIGS. 5A through 5C). The general summary may include information regarding the locations of the items on the support bar, or a location of the storage unit within an inventory area or a materials handling facility, or any other relevant information or data.

Figure 13:
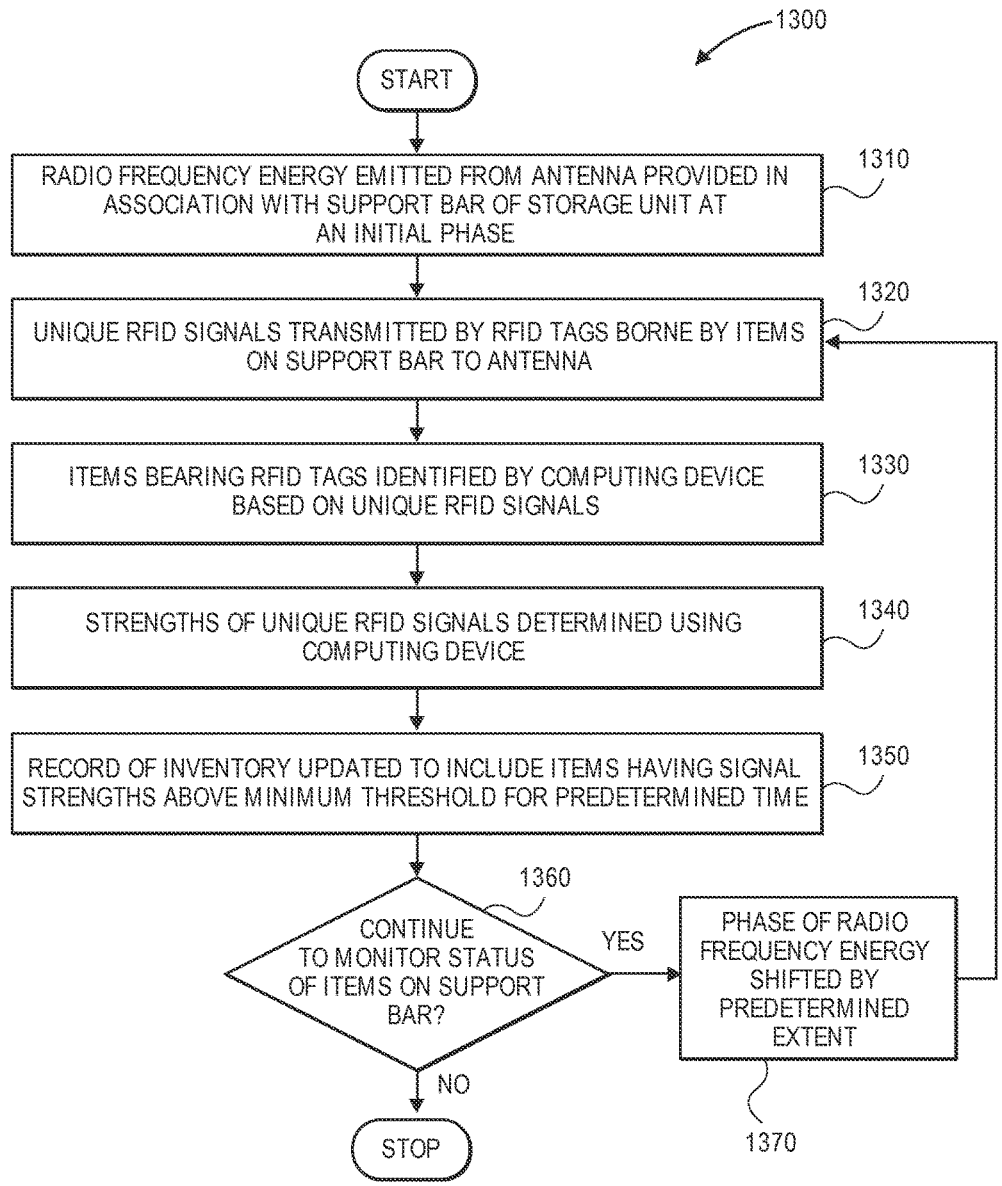
FIG. 13 is a view of one flow chart of one process for inventory tracking using RFID in accordance with implementations of the present disclosure.

In still other implementations, the systems and methods of the present disclosure may identify items based on RFID signals transmitted to RFID antennas from RFID tags borne by each of the items. The RFID antennas may be configured to emit electromagnetic fields at varying phases, which may be shifted or changed at predefined intervals, e.g., on the order of seconds or milliseconds, to ensure that items bearing RFID tags that are located in areas corresponding to weak RFID signals when the electromagnetic field is emitted in a first phase may be identified based on a stronger RFID signal when the electromagnetic field is emitted in a second phase. The RFID signals emitted in response to the electromagnetic fields at different phases may be used to confirm the presence of an item on a support bar where strengths of one or more of such RFID signals exceeds a threshold level for at least a predefined period of time, thereby further enhancing the probability that each of the items provided on the support bar will be identified and recognized. Referring to FIG. 13, a flow chart 1300 of one process for inventory tracking using RFID in accordance with implementations of the present disclosure is shown. At box 1310, RF energy is emitted from an RFID antenna provided in association with a support bar of a storage unit at an initial phase. For example, an RFID antenna may emit an electromagnetic field at a predetermined frequency and with selected amplitudes or peak intensities.

At box 1320, unique RFID signals are transmitted by RFID tags borne by items resting on the support bar to the RFID antenna, and at box 1330, the items bearing the RFID tags are identified by a computing device, e.g., based on information, data or metadata included in each of the RFID signals. For example, each of the RFID signals may be interpreted to identify the contents thereof, and at least some of the contents may be compared to a look-up table or other record or file including information correlating items to RFID tags or RFID signals that may be maintained in a data store. At box 1340, the strengths of the unique RFID signals are determined.

At box 1350, a record of inventory is updated to include items having signal strengths above a minimum threshold for at least a predetermined time period. For example, where an RFID signal is consistently recognized by an RFID antenna at intensity levels above a predefined threshold, or is so recognized with sufficient regularity, then it may be reliably determined that an item bearing the RFID tag that transmitted the RFID signal is suspended from the support bar, and information regarding the item and the strengths of one or more unique RFID signals emitted by the RFID tag may be stored in one or more data stores. Where the RFID signal is comparatively weak, however, or where the RFID signal is not recognized for a predetermined time, then the item may be assumed to have been removed from the support bar. Alternatively, a visual inspection of the support bar may be conducted in order to confirm whether the item is suspended therefrom.

At box 1360, whether the continued monitoring of the status of items on the support bar is determined. If the continued monitoring of the status of the items on the support bar is desired, then the process advances to box 1370, where the phase of the RF energy is shifted by a predetermined extent, before returning to box 1320, where unique RFID signals are transmitted by RFID tags of items resting on the support bar to the RFID antenna. The phase may be shifted by a nominal angle, e.g., thirty, forty-five, sixty, ninety, one hundred twenty, one hundred thirty-five or one hundred fifty degrees, or by any other angle, and the unique RFID signals that are received by the RFID antenna may be determined. Additionally, the phase may be shifted in accordance with a predetermined schedule. For example, in some implementations, an electromagnetic field may be emitted by an RFID antenna at a first phase for a first period of time, e.g., one hundred milliseconds (100 ms), and a level of impedance of the RFID antenna may be changed by a predetermined extent, e.g., by increasing the resistance of the RFID antenna using a phase shifter. Subsequently, the electromagnetic field may be emitted by the RFID antenna at a second phase for a second period of time, which may be equal to the first period of time, or of a different duration. Moreover, the emission of the electromagnetic fields at the first phase and the second phase may be delayed by a finite interval, e.g., five milliseconds (5 ms), during information regarding RFID signals received during the first phase may be determined and recorded. After the electromagnetic field is emitted by the RFID antenna at the second phase for the second period of time, the impedance may be changed to a third phase, or returned to the first phase, and the electromagnetic field may be emitted again for a third period of time. If the continued monitoring of the status of the items on the support bar is no longer desired, however, then the process ends.

Figure 14:
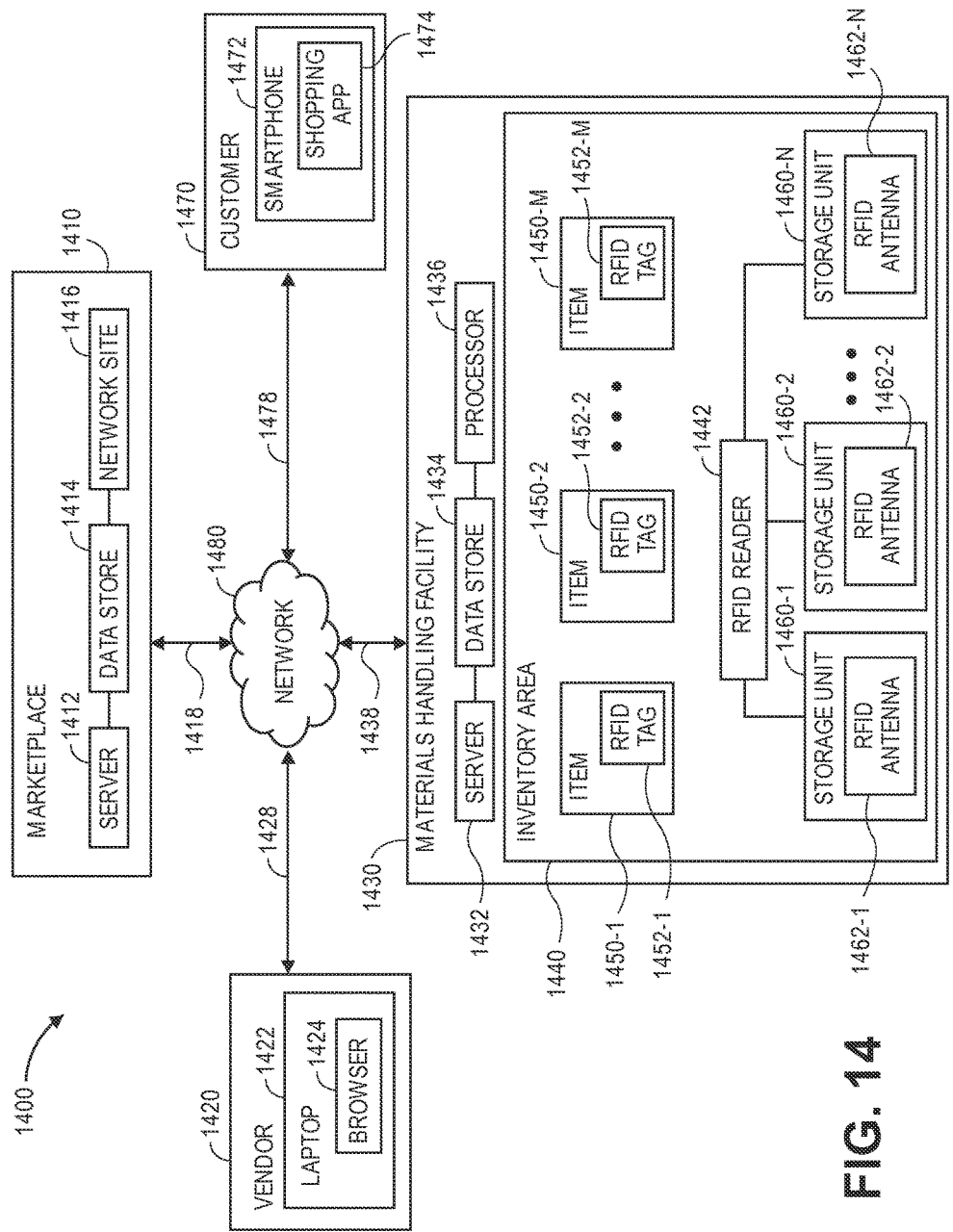
FIG. 14 is a block diagram of one system for inventory tracking using RFID in accordance with implementations of the present disclosure.

As is discussed above, the systems and methods of the present disclosure may be utilized in connection with the operations of any type or form of materials handling facilities, including but not limited to materials handling facilities associated with online marketplaces or retail establishments. Referring to FIG. 14, a block diagram of components of one system 1400 for inventory tracking using RFID in accordance with implementations of the present disclosure is shown. The system 1400 includes a marketplace 1410, a vendor 1420, a materials handling facility 1430 and a customer 1470 that are connected to one another across a network 1480, such as the Internet. Except where otherwise noted, reference numerals preceded by the number "14" shown in FIG. 14 indicate components or features that are similar to components or features having reference numerals preceded by the number "9" shown in FIGS. 9A through 9C, by the number "7" shown in FIGS. 7A through 7D, by the number "6" shown in FIGS. 6A and 6B, by the number "5"

shown in FIGS. 5A through 5C, by the number "4" shown in FIGS. 4A through 4C, by the number "3" shown in FIGS. 3A through 3C, by the number "2" shown in FIGS. 2A through 2D, or by the number "1" shown in FIGS. 1A through 1D.

The marketplace 1410 may be any entity or individual that wishes to make items from a variety of sources available for download, purchase, rent, lease or borrowing by customers using a networked computer infrastructure, including one or more physical computer servers 1412 and data stores (e.g., databases) 1414 for hosting a network site 1416. The marketplace 1410 may be physically or virtually associated with one or more storage or distribution facilities, such as the materials handling facility 1430. The network site 1416 may be implemented using the one or more servers 1412, which may connect or otherwise communicate with the one or more data stores 1414 as well as the network 1480, as indicated by line 1418, through the sending and receiving of digital data. Moreover, the data store 1414 may include any type of information regarding items that have been made available for sale through the marketplace 1410, or ordered by customers from the marketplace 1410.

The vendor 1420 may be any entity or individual that wishes to make one or more items available to customers, such as the customer 1470, by way of the marketplace 1410 and/or the materials handling facility 1430. The vendor 1420 may operate one or more order processing and/or communication systems using a computing device such as a laptop computer 1422 and/or software applications such as a web browser 1424, which may be implemented through one or more computing machines that may be connected to the network 1480, as is indicated by line 1428, in order to transmit or receive information in the form of digital or analog data regarding one or more items to be made available at the marketplace 1410 and/or the materials handling facility 1430, or for any other purpose.

The vendor 1420 may deliver one or more items to one or more designated facilities maintained by or on behalf of the marketplace 1410, such as the materials handling facility 1430, or to the materials handling facility 1430 or the customer 1470 directly. Additionally, the vendor 1420 may receive one or more items from other vendors, manufacturers or sellers (not shown), and may deliver one or more of such items to locations designated by the marketplace 1410, such as the materials handling facility 1430, for fulfillment and distribution to customers. Furthermore, the vendor 1420 may perform multiple functions. For example, the vendor 1420 may also be a manufacturer and/or a seller of one or more other items, and may offer items for purchase by customers at venues (not shown) other than the marketplace 1410 or the materials handling facility 1430. Additionally, items that are made available at the marketplace 1410 or the materials handling facility 1430 or ordered therefrom by customers such as the customer 1470 may be made by or obtained from one or more third party sources, other than the vendor 1420, or from any other source (not shown). Moreover, the marketplace 1410 itself may be a vendor, a seller or a manufacturer.

The materials handling facility 1430 may be any facility that is adapted to receive, store, process and/or distribute items on behalf of the marketplace 1410 and/or the vendor 1420, or to sell such items directly to customers. As is shown in FIG. 14, the materials handling facility 1430 includes a networked computer infrastructure for performing various computer-related functions associated with the receipt, storage, processing and distribution of such items, including one or more physical computer servers 1432, data stores (e.g., databases) 1434 and processors 1436, that may be provided in the same physical location as the fulfillment center 1410, or in one or more alternate or virtual locations, e.g., in a "cloud"-based environment. Operations of the materials handling facility 1430 may be implemented or controlled using the one or more servers 1412, which may connect or otherwise communicate with the one or more data stores 1414 as well as the network 1480, as indicated by line 1418, through the sending and receiving of digital data. Moreover, the data store 1414 may include any type of information regarding items that have been made available to customers through the materials handling facility 1430, or ordered by customers from the materials handling facility 1430. The materials handling facility 1430 may also include stations for receiving, storing and distributing items to customers, such as one or more receiving stations, storage areas and distribution stations.

As is shown in FIG. 14, the materials handling facility 130 includes one or more inventory areas 1440 configured to receive, store or distribute a plurality of m items 1450-1, 1450-2 . . . 1450-m therein. Each of the items 1450-1, 1450-2 . . . 1450-m shown in FIG. 14 bears or is adorned with an RFID tag 1452-1, 1452-2 . . . 1452-m. The inventory area 1440 further includes an RFID reader 1442 associated with a plurality of n storage units 1460-1, 1460-2 . . . 1460-n. Each of the storage units 1460-1, 1460-2 . . . 1460-n includes an RFID antenna 1460-1, 1460-2 . . . 1460-n within a predefined physical range of a support bar or arm for suspending one or more of the items 1450-1, 1450-2 . . . 1450-m therefrom. The RFID antennas 1462-1, 1462-2 . . . 1462-n are in communication with the RFID reader 1442.

The RFID tags 1452-1, 1452-2 . . . 1452-m may include one or more static or dynamic microchips or other memory components that may store information or data to be transmitted when the RFID tags 1452-1, 1452-2 . . . 1452-m are within range of an electric or magnetic field provided by an RFID reading system, such as the RFID reader 1442 and one or more of the RFID antennas 1462-1, 1462-2 . . . 1462-n.

The RFID reader 1442 includes one or more components for transmitting or receiving signals, such as the plurality of RFID antennas 1462-1, 1462-2 . . . 1462-n provided in the storage units 1460-1, 1460-2 . . . 1460-n throughout the inventory area 1440, as well as any type or number of circuitry components for processing and controlling the operation of the RFID reader 1442. Additionally, the RFID reader 1442 or the RFID antennas 1462-1, 1462-2 . . . 1462-n may be formed within a common integral unit at the inventory area 1440. Alternatively, the RFID reader 1442 and the RFID antennas 1462-1, 1462-2 . . . 1462-n may be mounted to or suspended above, within or around a working environment associated with the inventory area 1440, and operatively connected to one or more computer systems or networks, e.g., the server 1432, the data store 1434 or the processor 1436 within the materials handling facility 1430, or one or more external computer systems or networks through the sending and receiving of digital data over the network 1480 through the sending and receiving of digital data.

According to some embodiments, one or more of the RFID antennas 1462-1, 1462-2 . . . 1462-n associated with the RFID reader 1442 may be configured to receive RFID signals from RFID tags 1452-1, 1452-2 . . . 1452-m that are located within predefined ranges of the RFID antennas 1462-1, 1462-2 . . . 1462-n, e.g., approximately one inch (1") of one of the antennas, which may be determined by one or more factors including but not limited to the sensitivity or transmitting power of the RFID reader 1442, as well as the corresponding sizes of the RFID antennas 1462-1, 1462-2 . . . 1462-*n* with respect to the sizes of the RFID tags 1452-1, 1452-2 . . . 1452-*m*. Additionally, the RFID reader 1442 may communicate with RFID tags 1452-1, 1452-2 . . . 1452-*m* by way of any coupling modes or methods that may be known to those of ordinary skill in the pertinent arts. For example, an RFID tag 1452-1, 1452-2 . . . 1452-*m* may modulate one or more elements of the data stored thereon, and transmit a modulated data signal to a receiving circuit associated with the RFID reader 1442. Subsequently, the RFID reader 1442 may then demodulate the data signal, and provide a processed set of data derived from the data signal to the server 1432 or another computer device for further processing.

Moreover, the RFID reader 1442 may be configured to capture, evaluate, transmit or store any available information regarding signals received from the one or more RFID tags 1452-1, 1452-2 . . . 1452-*m*, including information regarding any attributes of the signals, including but not limited to sensed signal strengths or intensities, angular directions or ranges to the RFID tags 1452-1, 1452-2 . . . 1452-*m* from which such signals were received, any differences between the strengths, intensities, angular orientations or ranges associated with two or more signals, or information or data included in the signals. Although the inventory area 1440 of FIG. 14 is shown as including a single RFID reader 1442 associated with the plurality of RFID antennas 1462-1, 1462-2 . . . 1462-*n*, any number of RFID readers 1442 may be provided in association with any number of storage units 1460-1, 1460-2 . . . 1460-*n* and/or RFID antennas 1462-1, 1462-2 . . . 1462-*n* throughout the inventory area 1440, and in any number of specified locations, in accordance with the present disclosure.

The materials handling facility 1430 may operate one or more order processing and/or communication systems using computer devices in communication with one or more of the server 1432, the data store 1434 and/or the processor 1436, or through one or more other computing devices or machines that may be connected to the network 1480, as is indicated by line 1438, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the materials handling facility 1430 may include one or more receiving stations featuring any apparatuses that may be required in order to receive shipments of items at the materials handling facility 1430 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 1430 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The materials handling facility 1430 may further include one or more distribution stations where items that have been retrieved from a designated storage area may be evaluated, prepared and packed for delivery from the materials handling facility 1430 to addresses, locations or destinations specified by customers, also by way of carriers such as cars, trucks, trailers, freight cars, container ships or cargo aircraft (e.g., manned aircraft or unmanned aircraft, such as drones). The materials handling facility 1430 may also include customer accessible areas (e.g., shopping areas) within which customers may locate items, retrieve the items from inventory and transport the items to a cashier or one or more checkout stations having registers, scanners, scales, conveyors, bagging equipment, or any like features for processing transactions for such items by one or more customers in person, via an audio or video link (e.g., telephone or videophone), or in any other manner.

Moreover, the materials handling facility 1430 may further include one or more control systems that may generate instructions for conducting operations at the materials handling facility 1430, and may be in communication with the RFID reader 1442, and with one or more workers or the various storage facilities and other components of the materials handling facility 1430. Such control systems may also be associated with one or more other computing devices or machines, and may communicate with the marketplace 1410, the vendor 1420 or the customer 1470 over the network 1480, as indicated by line 1438, through the sending and receiving of digital data.

The customer 1470 may be any entity or individual that wishes to download, purchase, rent, lease, borrow or otherwise obtain items (e.g., goods, products, services or information of any type or form) from the marketplace 1410 or the materials handling facility 1430. The customer 1470 may utilize one or more computing devices, such as a smartphone 1472 or any other like machine that may operate or access one or more software applications, such as a web browser (not shown) or a shopping application 1474, and may be connected to or otherwise communicate with the marketplace 1410, the vendor 1420 or the materials handling facility 1430 through the network 1480, as indicated by line 1478, by the transmission and receipt of digital data. Moreover, the customer 1470 may also receive deliveries or shipments of one or more items from facilities maintained by or on behalf of the marketplace 1410, the materials handling facility 1430, or the vendor 1420.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," or a "customer" may be typically performed by a human operator, but could, alternatively, be performed by an automated agent.

The marketplace 1410, the vendor 1420, the materials handling facility 1430 and/or the customer 1470 may use any web-enabled or Internet applications or features, or any other client-server applications or features including electronic mail (or E-mail), or other messaging techniques, to connect to the network 1480 or to communicate with one another, such as through short or multimedia messaging service (SMS or MMS) text messages. For example, the server 1432 may be adapted to transmit information or data in the form of synchronous or asynchronous messages from the materials handling facility 1430 to the server 1412, the laptop computer 1422, a desktop computer, the server 1432, the smartphone 1472 or any other computer device in real time or in near-real time, or in one or more offline processes, via the network 1480. Those of ordinary skill in the pertinent art would recognize that the marketplace 1410, the vendor 1420, the materials handling facility 1430 or the customer 1470 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 1412, the laptop computer 1422, the server 1432, or the smartphone 1472, or any other computers or control systems utilized by the marketplace 1410, the vendor 1420, the materials handling facility 1430 or the customer 1470 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive. CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the implementations of storage units and/or inventory areas disclosed herein are referenced as being implemented within a fulfillment center associated with an online marketplace, those of ordinary skill in the pertinent arts will recognize that the systems and methods of the present disclosure are not so limited, and may be utilized in connection with any items that are to be suspended from a support arm or support bar provided in any environment or for any purpose. Furthermore, although some other implementations of storage units and/or inventory areas of the present disclosure are referenced as including support arms or support bars for supporting discrete, homogenous items, those of ordinary skill in the pertinent arts will recognize that such storage units and/or inventory areas may accommodate any type, form or number of items.

Moreover, those of ordinary skill in the pertinent arts will further recognize that any type, form or number of support arm may be provided singly or in tandem for the purpose of supporting one or more items thereon. For example, although some of the implementations disclosed herein include single support arms and single RFID antennas associated therewith, and items which include single slots or openings and single RFID tags, those of ordinary skill in the pertinent arts will recognize that two or more support arms having any number of RFID antennas associated therewith may be utilized to suspend one or more items, which may also bear or be adorned with two or more RFID tags.

Furthermore, those of ordinary skill in the pertinent arts will further recognize that the storage units of the present disclosure need not be mounted to pegboards or like structural features of a materials handling facility, or like facility. Rather, implementations of the present disclosure may include support bars or arms provided in association with RFID antennas in any manner. Such bars or arms and RFID antennas need not be mounted to a pegboard or even physically joined to one another, and are not limited in their application or implementation. As is discussed above, used herein, a "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. Likewise, the systems and methods of the present disclosure may also be utilized outside of a traditional materials handling facility environment. For example, when utilized in a home, a plurality of storage units including support bars or arms provided in association with RFID antennas may be installed in a kitchen, a pantry, a garage, a shed or a work area, to suspend items bearing RFID tags therefrom and track their respective arrival or departure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes shown in the flow charts of FIGS. 10-13, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An inventory area comprising:
   a panel;
   a storage unit releasably mounted to the panel, wherein the storage unit comprises:
   a base;
   a support bar having a proximal end mounted to a front face of the base, wherein a first section comprising the proximal end of the support bar extends substantially perpendicular to the front face of the base; and
   a transmission line having a proximal end mounted to the front face of the base at a predefined distance above the support bar, wherein the transmission line comprises:
   an RFID antenna configured to emit an electromagnetic field in at least a radial distance of the support bar, wherein the RFID antenna is coupled to an RFID reader, and wherein the RFID antenna extends substantially perpendicular to the front face of the base and substantially parallel to the support bar;
   a shield extending along a length of the RFID antenna at a predetermined distance from the RFID antenna; and
   a dielectric buffer extending along the length of the RFID antenna, wherein the dielectric buffer is provided between the shield and the RFID antenna within the predetermined distance; and
   an item suspended from the support bar, wherein the item comprises an RFID tag programmed to emit an RFID signal when the RFID tag senses the electromagnetic field.

2. The inventory area of claim 1, wherein the RFID antenna comprises a conductive rod formed from at least one of steel, aluminum or copper,
   wherein the shield defines a cross-section surrounding at least a portion of a circumference of the conductive rod at the predetermined distance, and
   wherein the dielectric buffer comprises a layer formed from at least one of acrylic or acrylonitrile butadiene styrene extending between the portion of the circumference of the conductive rod and the shield.

3. The inventory area of claim 1, wherein the cross-section of the shield has a shape of at least a portion of:
   a circle;
   a rectangle;
   a triangle; or
   an octagon.

4. A method comprising:
   emitting an electromagnetic field from a RFID transmission line comprising an RFID antenna, a support bar and a dielectric buffer, wherein the RFID antenna extends in parallel to at least a first section of a support bar, wherein the dielectric buffer extends in parallel to at least the first section of the support bar along a portion of a length of the RFID antenna, wherein the electromagnetic field is emitted in at least a first radial direction from the RFID antenna toward the support bar, wherein the dielectric buffer is provided in at least a second radial direction from the RFID antenna away from the support bar;

receiving, by the RFID antenna, a first RFID signal from a first RFID tag borne by a first item suspended from the first section of the support bar;

interpreting contents of the first RFID signal using at least one computer processor;

identifying information regarding the first RFID tag based at least in part on the interpreted contents of the first RFID signal using the at least one computer processor;

identifying a first item bearing the first RFID tag based at least in part on the information regarding the first RFID tag using the at least one computer processor;

determining that one of the first item bearing the first RFID tag is disposed on the support bar based at least in part on the first RFID signal using the at least one computer processor; and storing first information in at least one data store, wherein the first information associates the one of the first item bearing the first RFID tag with the support bar, wherein the RFID transmission line is configured to inhibit the electromagnetic field in at least the second radial direction, and wherein the RFID transmission line is configured to not inhibit the electromagnetic field in at least the first radial direction.

5. The method of claim 4, wherein the RFID antenna defines a first axis, and wherein the RFID transmission line further comprises:

a shield, wherein at least a portion of the shield is provided at a first distance from at least a portion of a circumference of the RFID antenna in parallel to the first axis, wherein the dielectric buffer extends in parallel to at least the first section of the support bar between the portion of the RFID antenna and the shield along at least the portion of the circumference of the RFID antenna.

6. The method of claim 5, wherein the RFID transmission line defines a cross-section having a shape of one of:

a sector, wherein the shield defines at least a portion of an arc of the sector;

a triangle, wherein the shield defines at least a portion of two of the sides of the triangle;

a rectangle, wherein the shield defines at least a portion of three of the sides of the rectangle.

7. The method of claim 6, wherein the arc of the sector subtends an angle of one of forty-five degrees, ninety degrees, one hundred thirty-five degrees, one hundred eighty degrees, two hundred twenty-five degrees or two hundred seventy degrees.

8. The method of claim 5, wherein the dielectric buffer is formed from at least one of:

an acrylic;
a paper;
a polyamide;
a polycarbonate;
a polychloroprene;
a polyester;
a polyethylene;
a polypropylene;
a polystyrene;
a polytetrafluoroethylene;
a polyvinyl chloride;
a porcelain;
a resin;
a rubber;
a silicone;
a styrene; or
a wax.

9. The method of claim 4, further comprising:

wherein storing the first information comprises at least one of:

adding an identifier of the first item to a record of inventory stored in the at least one data store; or increasing a quantity of the first item in the record of inventory stored in the at least one data store.

10. The method of claim 4, wherein the RFID antenna and at least the first section of the support bar are separated by a first predefined vertical distance, and wherein the method further comprises:

selecting a strength of the electromagnetic field based at least in part on the first predefined vertical distance.

11. The method of claim 4, further comprising:

determining that the first RFID signal is no longer received by the RFID antenna;

determining that the one of the first item bearing the first RFID tag is no longer disposed on the support bar based at least in part on the first RFID signal; and storing second information in at the at least one data store, wherein the second information dissociates the one of the first item bearing the first RFID tag from the support bar.

12. The method of claim 11, wherein storing the second information comprises at least one of:

decreasing a quantity of the first item in a record of inventory stored in the at least one data store;

removing an identifier of the first item from the record of inventory stored in the at least one data store.

13. The method of claim 4, further comprising:

determining a first location of the support bar on a panel using at least one computer processor; and storing a second indication that the first item bearing the first RFID tag is disposed on the support bar at the first location.

14. The method of claim 13, wherein the panel comprises a plurality of antenna connections, and wherein determining the first location of the support bar on the panel further comprises:

receiving, at a detection circuit, a voltage signal corresponding to a voltage level at one of the plurality of antenna connections;

identifying the one of the plurality of antenna connections to which the voltage signal corresponds using the at least one computer processor;

determining that the one of the plurality of antenna connections is associated with the location using the at least one computer processor; and determining that the one of the first item is disposed on the support bar at the location based at least in part on the voltage signal using the at least one computer processor.

15. The method of claim 4, wherein the first item further comprises a first extension having a first opening, and wherein the first RFID tag is affixed to the first extension between the first opening and an upper edge of the first extension.

16. The method of claim 15, further comprising:

extending a free distal end of the support bar through the first opening of the first extension, and causing the first item to be suspended from the support bar, wherein the first RFID tag is positioned between the RFID antenna and the support bar when the first item is suspended from the support bar.

17. A storage unit comprising:

a base; and a leaky transmission line comprising:

an RFID antenna comprising a conductive rod having a proximal end mounted to a front face of the base;

a shield having a proximal end mounted to the front face of the base, wherein the shield is provided at a first predetermined distance from at least a first portion of a circumference of the RFID antenna; and a dielectric buffer provided between the RFID antenna and an inner surface of the shield; and a support bar having a proximal end mounted to the front face of the base beneath a second portion of the circumference of the RFID antenna, wherein the leaky transmission line is configured to radially emit an electromagnetic field from the RFID antenna in at least a direction corresponding to the second portion of the circumference of the RFID antenna.

18. The storage unit of claim 17, further comprising:

a coaxial connector extending from a rear face of the base, wherein the coaxial connector comprises a compressible spring-biased cylinder and a pin within the cylinder, wherein the coaxial connector is coupled the RFID antenna, and wherein the coaxial connector is configured to receive radiofrequency energy from an external source and to transfer the radiofrequency energy to the RFID antenna.

19. The storage unit of claim 17, wherein the support bar comprises a first section including the proximal end mounted to the front face of the base and a second section including a free distal end of the support bar, wherein the first section of the support bar extends from the front face of the base in parallel to the RFID antenna, and wherein the second section of the support bar is canted upward at an acute angle with respect to the first section.

20. The storage unit of claim 17, wherein the shield defines a shape corresponding to at least a portion of at least one of:

a circle;

a rectangle;

a triangle;

a hexagon;

a pentagon; or an octagon, and wherein the dielectric buffer is formed from at least one of an acrylic or an acrylonitrile butadiene styrene.

* * * * *